US012658090B2

(12) United States Patent
Tomohiko

(10) Patent No.: US 12,658,090 B2
(45) Date of Patent: Jun. 16, 2026

(54) ARRAY SUBSTRATE AND DISPLAY PANEL COMPRISING THE SAME

(71) Applicant: Xiamen Tianma Optoelectronics Co., Ltd., Xiamen (CN)

(72) Inventor: Otose Tomohiko, Xiamen (CN)

(73) Assignee: Xiamen Tianma Optoelectronics Co., Ltd., Xiamen (CN)

( * ) Notice: Subject to any disclaimer, the term of this patent is extended or adjusted under 35 U.S.C. 154(b) by 0 days.

(21) Appl. No.: 19/197,259

(22) Filed: May 2, 2025

(65) Prior Publication Data

US 2025/0265957 A1 Aug. 21, 2025

(30) Foreign Application Priority Data

Dec. 27, 2024 (CN) ......................... 202411958713.9

(51) Int. Cl.
*G09G 3/20* (2006.01)

(52) U.S. Cl.
CPC ....... *G09G 3/20* (2013.01); *G09G 2310/0283* (2013.01); *G09G 2310/0286* (2013.01)

(58) Field of Classification Search
CPC ............. G09G 3/20; G09G 2310/0283; G09G 2310/0286
See application file for complete search history.

(56) References Cited

U.S. PATENT DOCUMENTS 9,715,860 B2 * 7/2017 Yang ...................... G11C 19/28
2016/0253975 A1 * 9/2016 Yang .................... G09G 3/3677 345/58

FOREIGN PATENT DOCUMENTS

CN 103426414 A 12/2013
CN 109377934 A * 2/2019 ............ G11C 19/28

OTHER PUBLICATIONS

Machine translation of CN-109377934-A. (Year: 2026).*

* cited by examiner

*Primary Examiner* — Michael Pervan
(74) *Attorney, Agent, or Firm* — CHRISTENSEN O'CONNOR JOHNSON KINDNESS PLLC

(57) ABSTRACT

Provided are an array substrate and a display panel. The array substrate includes a scanning circuit including shift register units, each of which includes a forward and reverse scanning module including a first to fourth input units. The first to fourth input units includes a first to fourth transistors, respectively. First electrodes of the first and fourth transistors are connected to a first power supply terminal continuously providing a low-level signal. First electrodes of the second and third transistors are connected to a second power supply terminal continuously providing a high-level signal. Second electrodes of the first to fourth transistors are connected to a pull-up node. The first and fourth transistors pull down a potential of the pull-up node. The second and third transistors pull up the potential. During switching between forward scanning and reverse scanning, the roles of the first to fourth transistors do not change.

21 Claims, 17 Drawing Sheets

ARRAY SUBSTRATE AND DISPLAY PANEL COMPRISING THE SAME

CROSS-REFERENCE TO RELATED APPLICATION

The present application claims priority to Chinese Application No. 202411958713.9, filed on Dec. 27, 2024, the content of which is incorporated herein by reference in its entirety.

TECHNICAL FIELD

The present application relates to the field of display technologies, and in particular, to an array substrate, and a display panel.

BACKGROUND

In the related art, a gate driver on array (GOA) includes a plurality of shift register units in cascade, the drive output terminal of each stage of the shift register unit corresponds to one gate line, so as to achieve row-by-row scanning of a display panel. With the technological development of the gate driver on array, the gate driver on array is generally required to be capable of realizing forward scanning and reverse scanning functions.

However, for conventional shift register units suitable for forward scanning and reverse scanning, after a long period of forward scanning or reverse scanning, some transistors in the shift register units may experience threshold voltage drift, resulting in the gate driver on array being unable to operate normally when switching the scanning direction.

SUMMARY

The present application aims to solve at least one of the technical problems existing in the related art, and provides an array substrate, and a display panel, so as to solve the problem of threshold drift of transistors in the shift register units for forward scanning and reverse scanning.

In one aspect, the present application provides an array substrate including: a scanning circuit including multiple stages of shift register units, where each shift register of the shift register units includes at least a first input unit, a second input unit, a third input unit, and a fourth input unit,

- where a control terminal of the first input unit is electrically connected to a first trigger terminal, an input terminal of the first input unit is electrically connected to a first power supply terminal, and an output terminal of the first input unit is electrically connected to a pull-up node, where the first input unit is configured to adjust a potential of the pull-up node based on a first power supply signal provided by the first power supply terminal in response to the control of the first trigger terminal;
- a control terminal of the second input unit is electrically connected to a second trigger terminal, an input terminal of the second input unit is electrically connected to a second power supply terminal, and an output terminal of the second input unit is electrically connected to the pull-up node, where the second input unit is configured to adjust the potential of the pull-up node based on a second power supply signal provided by the second power supply terminal in response to the control of the second trigger terminal;

- a control terminal of the third input unit is electrically connected to a third trigger terminal, an input terminal of the third input unit is electrically connected to the second power supply terminal, and an output terminal of the third input unit is electrically connected to the pull-up node, where the third input unit is configured to the potential of the pull-up node based on the second power supply signal provided by the second power supply terminal in response to the control of the third trigger terminal;
- a control terminal of the fourth input unit is electrically connected to a fourth trigger terminal, an input terminal of the fourth input unit is electrically connected to the first power supply terminal, and an output terminal of the fourth input unit is electrically connected to the pull-up node, where the fourth input unit is configured to adjust the potential of the pull-up node based on the first power supply signal provided by the first power supply terminal in response to the control of the fourth trigger terminal; and
- where the first power supply signal and the second power supply signal have different electrical characteristics.

In another aspect, based on the same inventive concept, the present application provides an array substrate including X stages of shift register units, where each stage of the X stages of shift register units includes a forward and reverse scanning module, and the forward and reverse scanning module includes a first transistor, a second transistor, a third transistor, and a fourth transistor; and

- where a gate of the first transistor of a nth stage of shift register unit is connected to a shift output terminal of a (n−2i)th stage of shift register unit or a trigger line, and where $n \leq X$, and $i \geq 1$, a first electrode of the first transistor is connected to a first power supply terminal, and a second electrode of the first transistor is connected to a pull-up node;
- a gate of the second transistor of the nth stage of shift register unit is connected to a shift output terminal of a (n−i)th stage of shift register unit or the trigger line, a first electrode of the second transistor is connected to a second power supply terminal, and a second electrode of the second transistor is connected to the pull-up node;
- a gate of the third transistor of a nth stage of shift register unit is connected to a shift output terminal of a (n+i)th stage of shift register unit or the trigger line, a first electrode of the third transistor is connected to the second power supply terminal, and a second electrode of the third transistor is connected to the pull-up node; and
- a gate of the fourth transistor of the nth stage of shift register unit is connected to a shift output terminal of a (n+2i)th stage of shift register unit or the trigger line, a first electrode of the fourth transistor is connected to the first power supply terminal, and a second electrode of the fourth transistor is connected to the pull-up node.

In another aspect, based on the same inventive concept, the present application provides a display panel including the array substrate as described above.

In yet another aspect, based on the same inventive concept, the present application provides a display apparatus including the display panel as described above.

In the present application, the input terminal of the first input unit of each stage of the shift register unit is electrically connected to the first power supply terminal, the input terminal of the second input unit of each stage of the shift register unit is electrically connected to the second power supply terminal, the input terminal of the third input unit of each stage of the shift register unit is electrically connected to the second power supply terminal, and the input terminal of the fourth input unit of each stage of the shift register unit is electrically connected to the first power supply terminal. The output terminals of the first input unit, the second input unit, the third input unit, and the fourth input unit are electrically connected to the pull-up node. That is, each stage of the shift register unit includes a forward and reverse scanning module, and the forward and reverse scanning module includes a first transistor, a second transistor, a third transistor, and a fourth transistor. The first electrode of the first transistor is connected to the first power supply terminal, the first electrode of the second transistor is connected to the second power supply terminal, the first electrode of the third transistor is connected to the second power supply terminal, the first electrode of the fourth transistor is connected to the first power supply terminal, and the second electrodes of the first transistor, the second transistor, the third transistor, and the fourth transistor are all connected to the pull-up node. During the process of switching between forward scanning and reverse scanning, the first power supply terminal always provides the first power supply signal, and the second power supply terminal always provides the second power supply signal, which enables normal switching between forward scanning and reverse scanning and is beneficial to improving the stability and reliability of the shift register units.

BRIEF DESCRIPTION OF DRAWINGS

In order to more clearly illustrate the technical solutions in the embodiments of the present application or in the related art, the drawings required to be used in the description of the embodiments or the related art will be briefly introduced below. Apparently, the drawings in the following description are only the embodiments of the present application. For those of ordinary skill in the art, other drawings can also be obtained based on the drawings without creative efforts.

DESCRIPTION OF EMBODIMENTS

The technical solutions in embodiments of the present application will be clearly and completely described below in conjunction with the accompanying drawings in the embodiments of the present application. Apparently, the described embodiments are only some of the embodiments of the present application, and not all of the embodiments. Based on the embodiments of the present application, all other embodiments obtained by those of ordinary skill in the art without creative efforts shall fall within the protection scope of the present application.

The transistors employed in all embodiments of the present application may be thin-film transistors, field-effect transistors, or other devices having the same characteristics. Since the source and drain of each of the transistors employed here are symmetrical, there is no distinction between the source and the drain. In the embodiments of the present application, in order to differentiate the two electrodes of such a transistor other than the gate, one of the electrodes is referred to as the first electrode, and the other is referred to as the second electrode. The first electrode and the second electrode only differ in terms of naming, and there is no difference in essence. Furthermore, the transistors can be classified into N-type and P-type according to their characteristics. The following embodiments are all illustrated by taking N-type transistors as examples. It is conceivable that the implementation using P-type transistors can be readily envisioned by those skilled in the art without any creative efforts and thus also falls within the scope of protection of the embodiments of the present application.

Figure 1:
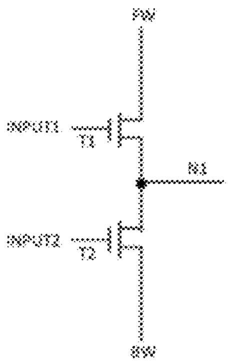
FIG. 1 is a schematic diagram of a circuit structure of a shift register unit in the related art.
Figure 2:
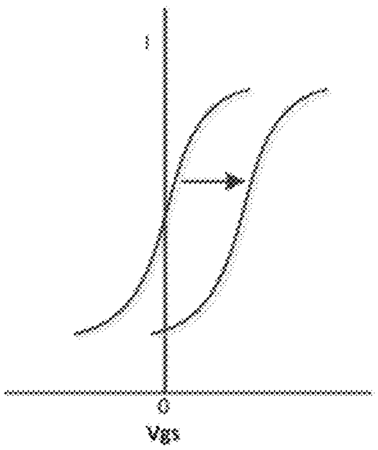
FIG. 2 is a schematic diagram of a current-gate-source voltage (I-Vgs) characteristic curve of a shift register unit in the related art.
Figure 3:
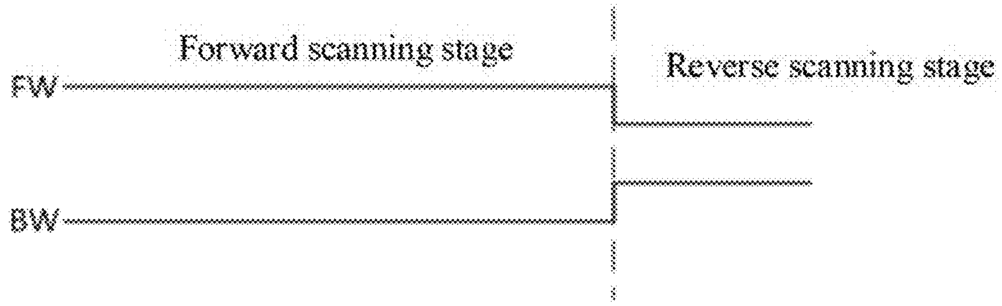
FIG. 3 is a schematic timing diagram of signals received by a forward-scanning input transistor and a reverse-scanning input transistor in a shift register unit in the related art.

FIG. 1 is a schematic diagram of a circuit structure of a shift register unit suitable for forward scanning and reverse scanning in the related art. As shown in FIG. 1, the shift register unit includes a forward-scanning input transistor T1, a reverse-scanning input transistor T2, and a first node N1. Taking the forward-scanning input transistor T1 and the reverse-scanning input transistor T2 both being N-type transistors as an example, during forward scanning, an input terminal FW of the forward-scanning input transistor T1 continuously provides a high-level signal, and an input terminal BW of the reverse-scanning input transistor T2 continuously provides a low-level signal. INPUT1 and INPUT2 are respectively connected to a gate of the forward-scanning input transistor T1 and a gate of the reverse-scanning input transistor T2, intermittently controlling the turn-on of the forward-scanning input transistor T1 and the reverse-scanning input transistor T2. During a long-term forward scanning process, the forward-scanning input transistor T1 pulls up a potential of the first node N1, and the reverse-scanning input transistor T2 pulls down the potential of the first node N1. Since a gate-source voltage Vgs of the reverse-scanning input transistor T2 is greater than a threshold voltage of the reverse-scanning input transistor T2 for a long time, resulting in the current-gate-source voltage (I-Vgs) characteristic curve of the reverse-scanning input transistor T2 producing a forward drift as shown in FIG. 2. Therefore, the threshold voltage of the reverse-scanning input transistor T2 increases and in turn its driving ability decreases. When the scanning direction is switched from forward scanning to reverse scanning, as shown in FIG. 3, the input terminal FW of the forward-scanning input transistor T1 changes to provide a low potential, the input terminal BW of the reverse-scanning input transistor T2 changes to provide a high potential, and level signals provided by the input terminal FW of the forward-scanning input transistor T1 and the input terminal BW of the reverse-scanning input transistor T2 are switched with each other. Since the threshold voltage of the reverse-scanning input transistor T2 becomes large and its driving ability decreases, which leads to a decrease in the potential written to the first node N1, the shift register unit cannot operate normally.

Figure 4:
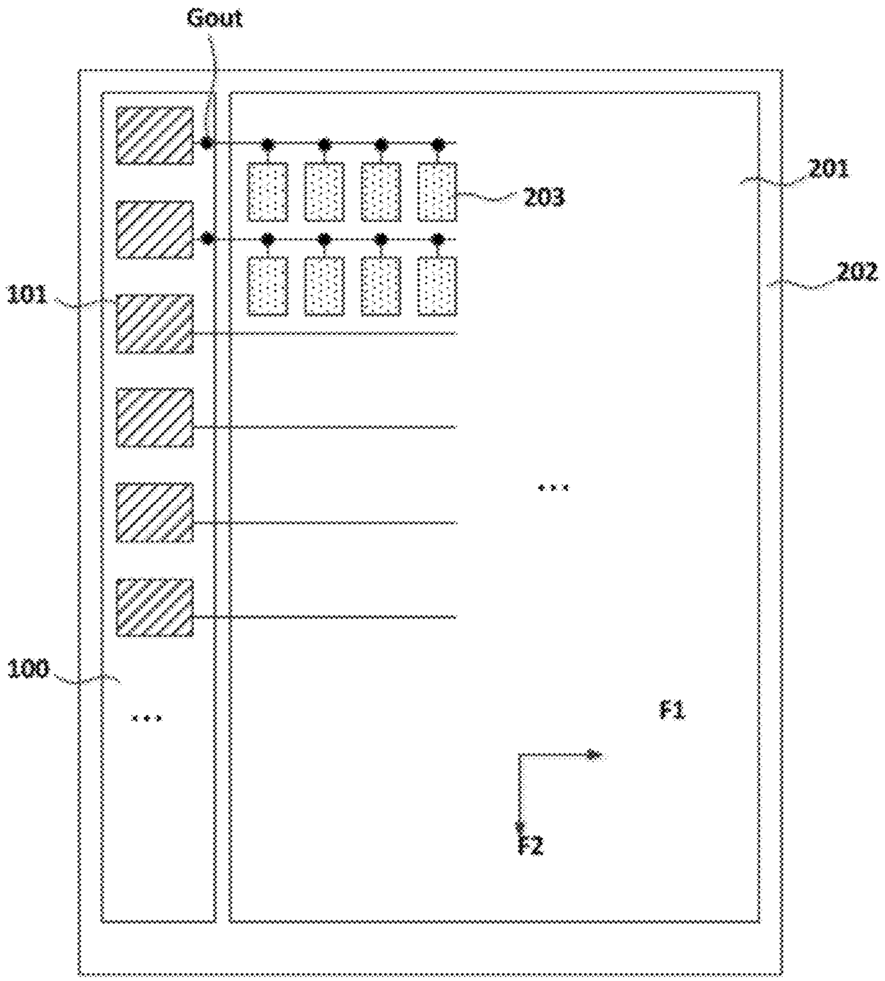
FIG. 4 is a schematic diagram of an array substrate provided by an embodiment of the present application.
Figure 5:
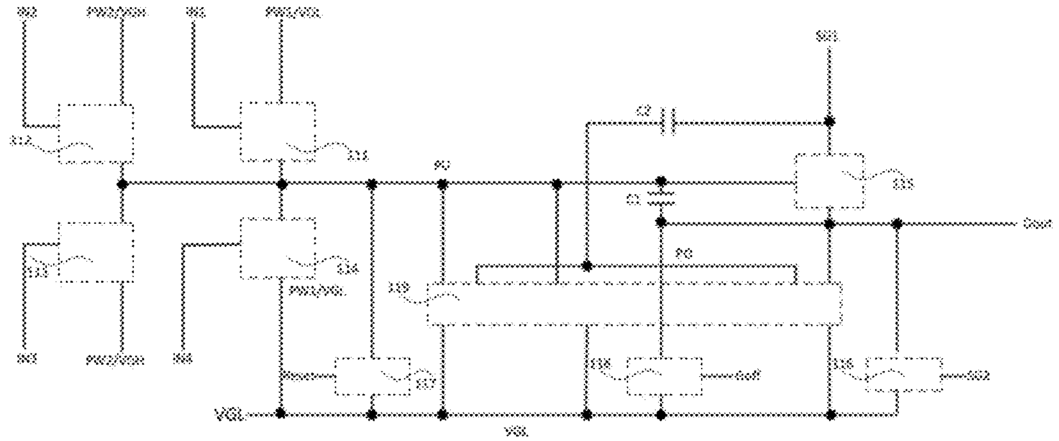
FIG. 5 is a schematic diagram of a shift register unit provided by an embodiment of the present application.

FIG. 4 is a schematic diagram of an array substrate provided by an embodiment of the present application, and FIG. 5 is a schematic diagram of a shift register unit provided by an embodiment of the present application. As shown in FIGS. 4 and 5, the array substrate includes a scanning circuit 100, and the scanning circuit includes X stages of shift register units 101. Each shift register unit of the shift register units includes at least a first input unit 111, a second input unit 112, a third input unit 113, and a fourth input unit 114. A control terminal of the first input unit 111 is electrically connected to a first trigger terminal IN1, an input terminal of the first input unit 111 is electrically connected to a first power supply terminal PW1, and an output terminal of the first input unit 111 is electrically connected to a pull-up node PU, for adjusting a potential of the pull-up node PU based on a first power supply signal VGL provided by the first power supply terminal PW1 in response to the control of the first trigger terminal IN1. A control terminal of the second input unit 112 is electrically connected to a second trigger terminal IN2, an input terminal of the second input unit 112 is electrically connected to a second power supply terminal PW2, and an output terminal of the second input unit 112 is electrically connected to the pull-up node PU, for adjusting the potential of the pull-up node PU based on a second power supply signal VGH provided by the second power supply terminal PW2 in response to the control of the second trigger terminal IN2. A control terminal of the third input unit 113 is electrically connected to a third trigger terminal IN3, an input terminal of the third input unit 113 is electrically connected to the second power supply terminal PW2, and an output terminal of the third input unit 113 is electrically connected to the pull-up node PU, for adjusting the potential of the pull-up node PU based on the second power supply signal VGH provided by the second power supply terminal PW2 in response to the control of the third trigger terminal IN3. A control terminal of the fourth input unit 114 is electrically connected to a fourth trigger terminal IN4, an input terminal of the fourth input unit 114 is electrically connected to the first power supply terminal PW1, and an output terminal of the fourth input unit 114 is electrically connected to the pull-up node PU, for adjusting the potential of the pull-up node PU based on the first power supply signal VGL provided by the first power supply terminal PW1 in response to the control of the fourth trigger terminal IN4. The first power supply signal VGL and the second power supply signal VGH have different electrical characteristics. In the present application, the first power supply signal VGL can turn off an N-type transistor, and the second power supply signal VGH can turn on an N-type transistor.

In this embodiment, the array substrate includes a display area 201 and a non-display area 202. The display area 201 includes a plurality of sub-pixels 203 arranged in an array. Multiple sub-pixels 203 are arranged along a first direction F1 to form a row of sub-pixels 203, and multiple sub-pixels 203 are arranged along a second direction F2 to form a column of sub-pixels 203. The first direction F1 and the second direction F2 intersect with each other. The arrangement of the pixels in the display area 201 can also be other arrangement and is not limited to the array arrangement. The non-display area 202 includes a driving structure for the sub-pixels 203 in the display area 201 to display. In particular, the non-display area 202 includes at least the scanning circuit 100, which is configured to drive the sub-pixels 203 in the display area to display. Optionally, the sub-pixels in the display area 201 can be liquid-crystal display units, organic light-emitting display units, or micro-light-emitting diode display units, without specific limitation. The scanning circuit 100 in the non-display area 202 is a gate driver on array, which is configured to control the sub-pixels 203 in the display area 201 to perform row-by-row scanning.

The scanning circuit 100 includes multiple stages of shift register units 101. Each shift register unit of the shift register units 101 includes a drive output terminal Gout. One stage of shift register unit 101 is electrically connected to one or more rows of sub-pixels 203 through the drive output terminal Gout. The shift register units 101 each provide a gate drive signal to the electrically connected sub-pixels 203 through the drive output terminal Gout to drive the sub-pixels 203 to operate. In FIG. 4, each of the shift register units 101 can be selected to be electrically connected to one row of sub-pixels 203 correspondingly, and each of the shift register units 101 provides the gate drive signal to the corresponding one row of sub-pixels 203. However, in other embodiments, one stage of shift register unit can be selected to be correspondingly connected to multiple rows of sub-pixels, and the one stage of shift register unit provides the gate drive signal to the multiple rows of sub-pixels simultaneously or in a time-sharing manner.

In this embodiment, the shift register unit 101 includes the first input unit 111. The control terminal of the first input unit 111 is electrically connected to the first trigger terminal IN1, the input terminal of the first input unit 111 is connected to the first power supply terminal PW1, and the output terminal of the first input unit is connected to the pull-up node PU. In particular, an electrical signal provided by the first trigger terminal IN1 is a signal that changes continuously, whereby an on or off state of the first input unit 111 can be controlled. It can be understood that the present application is illustrated by taking the transistors in the shift register unit 101 as N-type transistors. Therefore, a high-level signal can turn on the first input unit 111, and a low-level signal can turn off the first input unit 111. If the first trigger terminal IN1 provides a high-level signal, the first power supply signal VGL provided by the first power supply terminal PW1 is written into the pull-up node PU. If the first trigger terminal IN1 provides a low-level signal, the first input unit 111 switches to the off state, and a transmission path between the first power supply terminal PW1 and the pull-up node PU is disconnected. Therefore, the first input unit 111 is configured to adjust the potential of the pull-up node PU based on the first power supply signal VGL provided by the first power supply terminal PW1 in response to the control of the first trigger terminal IN1.

The shift register unit 101 includes the second input unit 112. The control terminal of the second input unit 112 is electrically connected to the second trigger terminal IN2, the input terminal of the second input unit 112 is connected to the second power supply terminal PW2, and the output terminal of the second input unit is connected to the pull-up node PU. In particular, an electrical signal provided by the second trigger terminal IN2 is a signal that changes continuously, whereby an on or off state of the second input unit 112 can be controlled. It can be understood that the present application is illustrated by taking the transistors in the shift register unit 101 as N-type transistors. Therefore, a high-level signal can turn on the second input unit 112, and a low-level signal can turn off the second input unit 112. If the second trigger terminal IN2 provides a high-level signal, the second power supply signal VGH provided by the second power supply terminal PW2 is written into the pull-up node PU. If the second trigger terminal IN2 provides a low-level signal, the second input unit 112 switches to the off state, and a transmission path between the second power supply terminal PW2 and the pull-up node PU is disconnected. Therefore, the second input unit 112 is configured to adjust the potential of the pull-up node PU based on the second power supply signal VGH provided by the second power supply terminal PW2 in response to the control of the second trigger terminal IN2.

The shift register unit 101 includes the third input unit 113. The control terminal of the third input unit 113 is electrically connected to the third trigger terminal IN3, the input terminal of the third input unit 113 is connected to the second power supply terminal PW2, and the output terminal of the third input unit is connected to the pull-up node PU. In particular, an electrical signal provided by the third trigger terminal IN3 is a signal that changes continuously, whereby an on or off state of the third input unit 113 can be controlled. It can be understood that the present application is illustrated by taking the transistors in the shift register unit 101 as N-type transistors. Therefore, a high-level signal can turn on the third input unit 113, and a low-level signal can turn off the third input unit 113. If the third trigger terminal IN3 provides a high-level signal, the second power supply signal VGH provided by the second power supply terminal PW2 is written into the pull-up node PU. If the third trigger terminal IN3 provides a low-level signal, the third input unit 113 switches to the off state, and the transmission path between the second power supply terminal PW2 and the pull-up node PU is disconnected. Therefore, the third input unit 113 is configured to adjust the potential of the pull-up node PU based on the second power supply signal VGH provided by the second power supply terminal PW2 in response to the control of the third trigger terminal IN3.

The shift register unit 101 includes the fourth input unit 114. The control terminal of the fourth input unit 114 is electrically connected to the fourth trigger terminal IN4, the input terminal of the fourth input unit 114 is connected to the first power supply terminal PW1, and the output terminal of the fourth input unit 114 is connected to the pull-up node PU. In particular, an electrical signal provided by the fourth trigger terminal IN4 is a signal that changes continuously, whereby an on or off state of the fourth input unit 114 can be controlled. It can be understood that the present application is illustrated by taking the transistors in the shift register unit 101 as N-type transistors. Therefore, a high-level signal can turn on the fourth input unit 114, and a low-level signal can turn off the fourth input unit 114. If the fourth trigger terminal IN4 provides a high-level signal, the first power supply signal VGL provided by the first power supply terminal PW1 is written into the pull-up node PU. If the fourth trigger terminal IN4 provides a low-level signal, the fourth input unit 114 switches to the off state, and the transmission path between the first power supply terminal PW1 and the pull-up node PU is disconnected. Therefore, the fourth input unit 114 is configured to adjust the potential of the pull-up node PU based on the first power supply signal VGL provided by the first power supply terminal PW1 in response to the control of the fourth trigger terminal IN4.

In this embodiment, the input terminal of the first input unit 111 of the shift register unit 101 is electrically connected to the first power supply terminal PW1, the input terminal of the second input unit 112 is electrically connected to the second power supply terminal PW2, the input terminal of the third input unit 113 is electrically connected to the second power supply terminal PW2, the input terminal of the fourth input unit 114 is electrically connected to the first power supply terminal PW1, and the output terminals of the first input unit 111, the second input unit 112, the third input unit 113, and the fourth input unit 114 are electrically connected to the pull-up node PU. Regardless of a forward scanning mode or a reverse scanning mode, the first input unit 111 and the fourth input unit 114 pull down the potential of the pull-up node PU, the second input unit 112 and the third input unit 113 pull up the potential of the pull-up node PU, and the potentials of the input terminals of the first input unit 111 to the fourth input unit 114 do not need to undergo a high and low jump during the process of switching between the forward scanning mode and reverse scanning mode as in the related art. Therefore, it is possible to normally switch to the reverse scanning mode after a long period of the forward scanning mode, or to normally switch to the forward scanning mode after a long period of the reverse scanning mode.

Optionally, the shift register units 101 each further includes an output unit 115. A control terminal of the output unit 115 is electrically connected to the pull-up node PU, an input terminal of the output unit 115 is electrically connected to a first signal terminal SG1, and an output terminal of the output unit 115 is electrically connected to the drive output terminal Gout. In particular, the potential of the pull-up node PU is controlled by the first input unit 111, the second input unit 112, the third input unit 113, and the fourth input unit 114 to undergo a high-low level jump, whereby an on or off state of the output unit 115 can be controlled. In the embodiment of the present application, a first signal provided by the first signal terminal SG1 can be a clock signal, which is denoted as a first clock signal CK1. It can be understood that if the potential of the pull-up node PU is a high-level potential, the output unit 115 is controlled to switch to the on state, and the first clock signal CK1 provided by the first signal terminal SG1 is written into the drive output terminal Gout. If the potential of the pull-up node PU is a low-level potential, the output unit 115 is controlled to switch to the off state, and a transmission path between the first signal terminal SG1 and the drive output terminal Gout is disconnected. Therefore, the output unit 115 is configured to adjust a signal of the drive output terminal Gout based on the first signal provided by the first signal terminal SG1 in response to the control of the pull-up node PU.

Optionally, the shift register unit further includes a first reset unit 116. A control terminal of the first reset unit 116 is electrically connected to a second signal terminal SG2, a input terminal of the first reset unit 116 is electrically connected to the first power supply terminal PW1, and an output terminal of the first reset unit 116 is electrically connected to the drive output terminal Gout, for adjusting the signal of the drive output terminal Gout based on the first power supply signal VGL provided by the first power supply terminal PW1 in response to the control of a second signal provided by the second signal terminal SG2. In particular, the second signal provided by the second signal terminal SG2 can be a clock signal, which is denoted as a second clock signal CK2, and the second clock signal CK2 can control an on or off state of the first reset unit 116. It can be understood that if a potential of the second clock signal CK2 is a high-level potential, the first reset unit 116 is controlled to switch to the on state, and the first power supply signal VGL provided by the first power supply terminal PW1 is written into the drive output terminal Gout. If the potential of the second clock signal CK2 is a low-level potential, the first reset unit 116 is controlled to switch to the off state, and a transmission path between the first power supply terminal PW1 and the drive output terminal Gout is disconnected. Therefore, the first reset unit 116 is configured to adjust the signal of the drive output terminal Gout based on the first power supply signal VGL provided by the first power supply terminal PW1 in response to the control of the second signal terminal SG2.

Optionally, the shift register unit further includes a second reset unit 117, a third reset unit 118, and a node control unit 119.

A control terminal of the second reset unit 117 is electrically connected to a third signal terminal Reset, an input terminal of the second reset unit 117 is electrically connected to the first power supply terminal PW1, and an output terminal of the second reset unit 117 is electrically connected to the pull-up node PU, for adjusting the potential of the pull-up node PU based on the first power supply signal VGL provided by the first power supply terminal PW1 in response to the control of the third signal terminal Reset. In particular, an electrical signal provided by the third signal terminal Reset is a signal that changes continuously, whereby an on or off state of the second reset unit 117 can be controlled. It can be understood that if a potential of a level signal provided by the third signal terminal Reset is a high-level potential, the second reset unit 117 is controlled to switch to the on state, and the first power supply signal VGL provided by the first power supply terminal PW1 is written into the pull-up node PU. If the potential of the level signal provided by the third signal terminal Reset is a low-level potential, the second reset unit 117 is controlled to switch to the off state, and a transmission path between the first power supply terminal PW1 and the pull-up node PU is disconnected. Therefore, the second reset unit 117 is configured to adjust the potential of the pull-up node PU based on the first power supply signal VGL provided by the first power supply terminal PW1 in response to the control of the third signal terminal Reset.

A control terminal of the third reset unit 118 is electrically connected to a fourth signal terminal Goff, an input terminal of the third reset unit 118 is connected to the first power supply terminal PW1, and an output terminal of the third reset unit 118 is electrically connected to the drive output terminal Gout, for adjusting the signal of the drive output terminal Gout based on the first power supply signal VGL provided by the first power supply terminal PW1 in response to the control of the fourth signal terminal Goff. In particular, an electrical signal provided by the fourth signal terminal Goff is a signal that changes continuously, whereby an on or off state of the third reset unit 118 can be controlled. It can be understood that if a potential of a level signal provided by the fourth signal terminal Goff is a high-level potential, the third reset unit 118 is controlled to switch to the on state, and the first power supply signal VGL provided by the first power supply terminal PW1 is written into the drive output terminal Gout. If the potential of the level signal provided by the fourth signal terminal Goff is a low-level potential, the third reset unit 118 is controlled to switch to the off state, and the transmission path between the first power supply terminal PW1 and the drive output terminal Gout is disconnected. Therefore, the third reset unit 118 is configured to adjust the signal of the drive output terminal Gout based on the first power supply signal VGL provided by the first power supply terminal PW1 in response to the control of the fourth signal terminal Goff.

A control terminal of the node control unit 119 is electrically connected to the pull-up node PU and a pull-down node PD, an input terminal of the node control unit 119 is electrically connected to the first power supply terminal PW1, and an output terminal of the node control unit 119 is electrically connected to the pull-up node PU, the pull-down node PD, and the drive output terminal Gout, for adjusting a signal of the pull-up node PU, a signal of the pull-down node PD, and the signal of the drive output terminal based on the first power supply signal VGL provided by the first power supply terminal PW1 in response to the control of the pull-up node PU or the pull-down node PD. In particular, the node control unit 119 has at least one control terminal electrically connected to the pull-up node PU and at least one control terminal electrically connected to the pull-down node PD. The signals of the pull-up node PU and the pull-down node PD may undergo a high-low level jump. If the potential of the pull-up node PU is a high-level potential, the first power supply signal VGL provided by the first power supply terminal PW1 is written into the pull-down node PD. If the potential of the pull-up node PU is a low-level potential, a transmission path between the first power supply terminal PW1 and the pull-down node PD is disconnected. If the potential of the pull-down node PD is a high-level potential, the first power supply signal VGL provided by the first power supply terminal PW1 is written into the pull-up node PU and the drive output terminal Gout. If the potential of the pull-down node PD is a low-level potential, the transmission path between the first power supply terminal PW1 and the pull-up node PU, and the transmission path between the first power supply terminal PW1 and the drive output terminal Gout are both disconnected. Therefore, the node control unit 119 is configured to adjust the signal of the pull-up node PU, the signal of the pull-down node PD, and the signal of the drive output terminal Gout based on the first power supply signal VGL provided by the first power supply terminal PW1 in response to the control of the pull-up node PU or the pull-down node PD.

In this embodiment, the scanning circuit 100 can implement the forward scanning and reverse scanning functions. In the forward scanning mode or the reverse scanning mode, the input terminal of the first input unit 111 provides the first power supply signal VGL, the input terminal of the second input unit 112 provides the second power supply signal VGH, the input terminal of the third input unit 113 provides the second power supply signal VGH, and the input terminal of the fourth input unit 114 provides the first power supply signal VGL. The first input unit 111 and the fourth input unit 114 pull down the potential of the pull-up node PU, while the second input unit 112 and the third input unit 113 pull up the potential of the pull-up node PU. Compared with the related art, after the scanning direction is switched, the functions of the first input unit 111, the second input unit 112, the third input unit 113, and the fourth input unit 114 do not change. That is, the power supply signals provided by the input terminals of the first input unit 111, the second input unit 112, the third input unit 113, and the fourth input unit 114 will not change. Even if the threshold voltages of the transistors in the first input unit 111 and the fourth input unit 114 increase, since there is no need to switch the pull-up action, the driving ability will not decrease, and the potential written to the pull-up node PU will not decrease either, which can ensure that the shift register unit 101 can operate normally.

Figure 6:
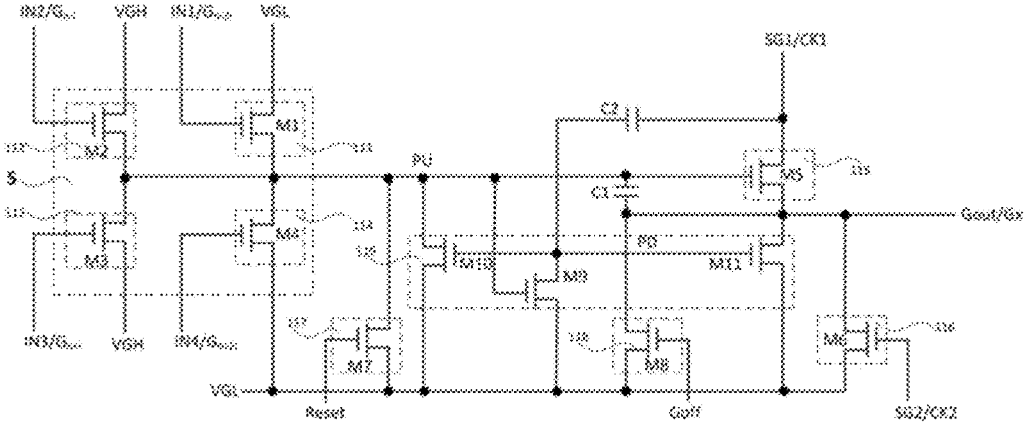
FIG. 6 is a schematic diagram of another shift register unit provided by an embodiment of the present application.

FIG. 6 is a schematic diagram of another shift register unit provided by an embodiment of the present application. As shown in FIG. 6, optionally, the shift register unit 101 includes a forward and reverse scanning module S, and the forward and reverse scanning module S includes a first input unit 111, a second input unit 112, a third input unit 113, and a fourth input unit 114.

The first input unit 111 includes a first transistor M1. A gate of the first transistor M1 is connected to the first trigger terminal IN1, the first transistor M1 is connected between the first power supply terminal PW1 and the pull-up node PU, a first electrode of the first transistor M1 is connected to the first power supply terminal PW1, and a second electrode of the first transistor M1 is connected to the pull-up node PU. The second input unit 112 includes a second transistor M2. A gate of the second transistor M2 is connected to the second trigger terminal IN2, the second transistor M2 is connected between the second power supply terminal PW2 and the pull-up node PU, a first electrode of the second transistor M2 is connected to the second power supply terminal PW2, and a second electrode of the second transistor M2 is connected to the pull-up node PU. The third input unit 113 includes a third transistor M3. A gate of the third transistor M3 is connected to the third trigger terminal IN3, the third transistor M3 is connected between the second power supply terminal PW2 and the pull-up node PU, a first electrode of the third transistor M3 is connected to the second power supply terminal PW2, and a second electrode of the third transistor M3 is connected to the pull-up node PU. The fourth input unit 114 includes a fourth transistor M4. A gate of the fourth transistor M4 is connected to the fourth trigger terminal IN4, the fourth transistor M4 is connected between the first power supply terminal PW1 and the pull-up node PU, a first electrode of the fourth transistor M4 is connected to the first power supply terminal PW1, and a second electrode of the fourth transistor M4 is connected to the pull-up node PU.

Optionally, the output unit 115 includes a fifth transistor M5. A gate of the fifth transistor M5 is connected to the pull-up node PU, the fifth transistor M5 is connected between the first signal terminal SG1 and the drive output terminal Gout, a first electrode of the fifth transistor M5 is connected to the first signal terminal SG1, and a second electrode of the fifth transistor M5 is connected to the drive output terminal Gout. In particular, when the potential of the pull-up node PU is a high level, the fifth transistor M5 is turned on, and the first clock signal CK1 provided by the first signal terminal SG1 is written into the drive output terminal Gout. On the contrary, when the potential of the pull-up node PU is a low level, the fifth transistor M5 is turned off.

Optionally, the first reset unit 116 includes a sixth transistor M6. A gate of the sixth transistor M6 is connected to the second signal terminal SG2, the sixth transistor M6 is connected between the first power supply terminal PW1 and the drive output terminal Gout, a first electrode of the sixth transistor M6 is connected to the first power supply terminal PW1, and a second electrode of the sixth transistor M6 is connected to the drive output terminal Gout. When the second clock signal CK2 provided by the second signal terminal SG2 is a high level, the sixth transistor M6 is turned on, and the first power supply signal VGL provided by the first power supply terminal PW1 is written into the drive output terminal Gout. On the contrary, when the second clock signal CK2 provided by the second signal terminal SG2 is a low level, the sixth transistor M6 is turned off.

Optionally, the second reset unit 117 includes a seventh transistor M7. A gate of the seventh transistor M7 is connected to the third signal terminal Reset, the seventh transistor M7 is connected between the first power supply terminal PW1 and the pull-up node PU, a first electrode of the seventh transistor M7 is connected to the first power supply terminal PW1, and a second electrode of the seventh transistor M7 is connected to the pull-up node PU.

Optionally, the third reset unit 118 includes an eighth transistor M8. A gate of the eighth transistor M8 is connected to the fourth signal terminal Goff, the eighth transistor M8 is connected between the first power supply terminal PW1 and the drive output terminal Gout, a first electrode of the eighth transistor M8 is connected to the first power supply terminal PW1, and a second electrode of the eighth transistor M8 is connected to the drive output terminal Gout. For either the seventh transistor M7 or the eighth transistor M8, when a potential of the gate of the transistor is a high level, the transistor is turned on. On the contrary, for either the seventh transistor M7 or the eighth transistor M8, when the potential of the gate of the transistor is a low level, the transistor is turned off.

Optionally, the node control unit 119 includes a ninth transistor M9, a tenth transistor M10, and an eleventh transistor M11. A gate of the ninth transistor M9 is connected to the pull-up node PU, the ninth transistor M9 is connected between the first power supply terminal PW1 and a pull-down node PD, a first electrode of the ninth transistor M9 is connected to the first power supply terminal PW1, and a second electrode of the ninth transistor M9 is connected to the pull-down node PD. The gate of the tenth transistor M10 and a gate of the eleventh transistor M11 are both connected to the pull-down node PD. The tenth transistor M10 is connected between the first power supply terminal PW1 and the pull-up node PU, a first electrode of the tenth transistor M10 is connected to the first power supply terminal PW1, and a second electrode of the tenth transistor M10 is connected to the pull-up node PU. The eleventh transistor M11 is connected between the first power supply terminal PW1 and the drive output terminal Gout, a first electrode of the eleventh transistor M11 is connected to the first power supply terminal PW1, and a second electrode of the eleventh transistor M11 is connected to the drive output terminal Gout. For any one of the ninth transistor M9, the tenth transistor M10, and the eleventh transistor M11, when the potential of the gate of the transistor is a high level, the transistor is turned on. On the contrary, for any one of the ninth transistor M9, the tenth transistor M10, and the eleventh transistor M11, when the potential of the gate of the transistor is a low level, the transistor is turned off.

Optionally, the shift register unit further includes a first capacitor C1 and a second capacitor C2. The first capacitor C1 is coupled between the drive output terminal Gout and the pull-up node PU, a first electrode of the first capacitor C1 is connected to the drive output terminal Gout, and a second electrode of the first capacitor C1 is connected to the pull-up node PU. The second capacitor C2 is coupled between the first signal terminal SG1 and the pull-down node PD, a first electrode of the second capacitor C2 is connected to the first signal terminal SG1, and a second electrode of the second capacitor C2 is connected to the pull-down node PD.

In this embodiment, the first capacitor C1 is coupled between the pull-up node PU and the drive output terminal Gout. When the pull-up node PU is in a floating state, a change in a potential of the drive output terminal Gout affects a change in the potential of the pull-up node PU. In particular, if the potential of the drive output terminal Gout jumps from a high level to a low level, the potential of the pull-up node PU is pulled down; or, if the potential of the drive output terminal Gout jumps from a low level to a high level, the potential of the pull-up node PU is bootstrapped up.

The second capacitor C2 is coupled between the pull-down node PD and the first signal terminal SG1. When the pull-down node PD is in a floating state, a change in a potential of the first clock signal CK1 provided by the first signal terminal SG1 affects a change in the potential of the pull-down node PD. In particular, if the first clock signal CK1 jumps from a high level to a low level, the potential of the pull-down node PD is pulled down; or, if the first clock signal CK1 jumps from a low level to a high level, the potential of the pull-down node PD is bootstrapped up.

It can be understood that the structure of the shift register unit in the present application includes, but is not limited to, the 11T2C structure shown in FIG. 6. Relevant practitioners can reasonably design the structure of the shift register unit according to the product requirements and the application scenarios of the shift register unit. The present application will not elaborate on other structures of the shift register unit.

In this embodiment, the shift register unit 101 shown in FIG. 6 is taken as an example to describe its operating process. The first power supply signal VGL provided by the first power supply terminal PW1 is a low-level signal, and the second power supply signal VGH provided by the second power supply terminal PW2 is a high-level signal. VGL can turn off a N-type transistor, and VGH can turn on a N-type transistor. The scanning circuit 100 can perform forward scanning and reverse scanning.

Figure 7:
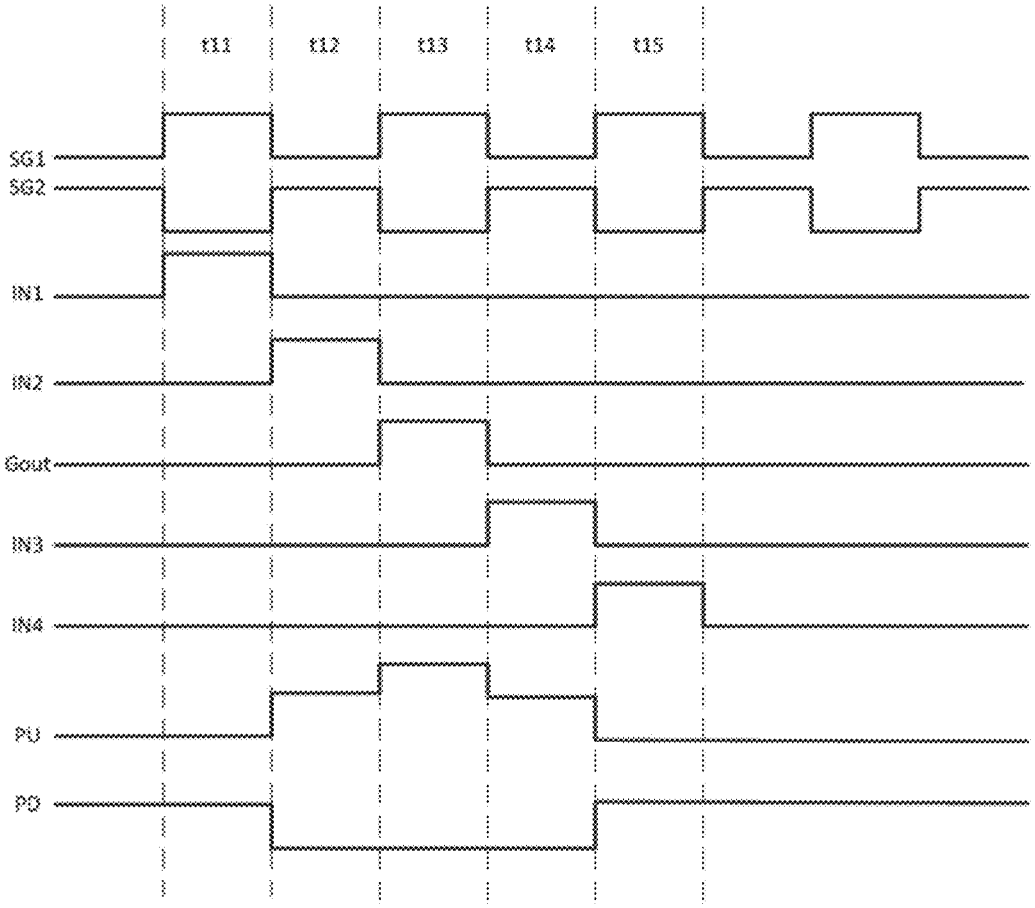
FIG. 7 is a schematic timing diagram of the shift register unit shown in FIG. 6 performing forward scanning.
Figure 8:
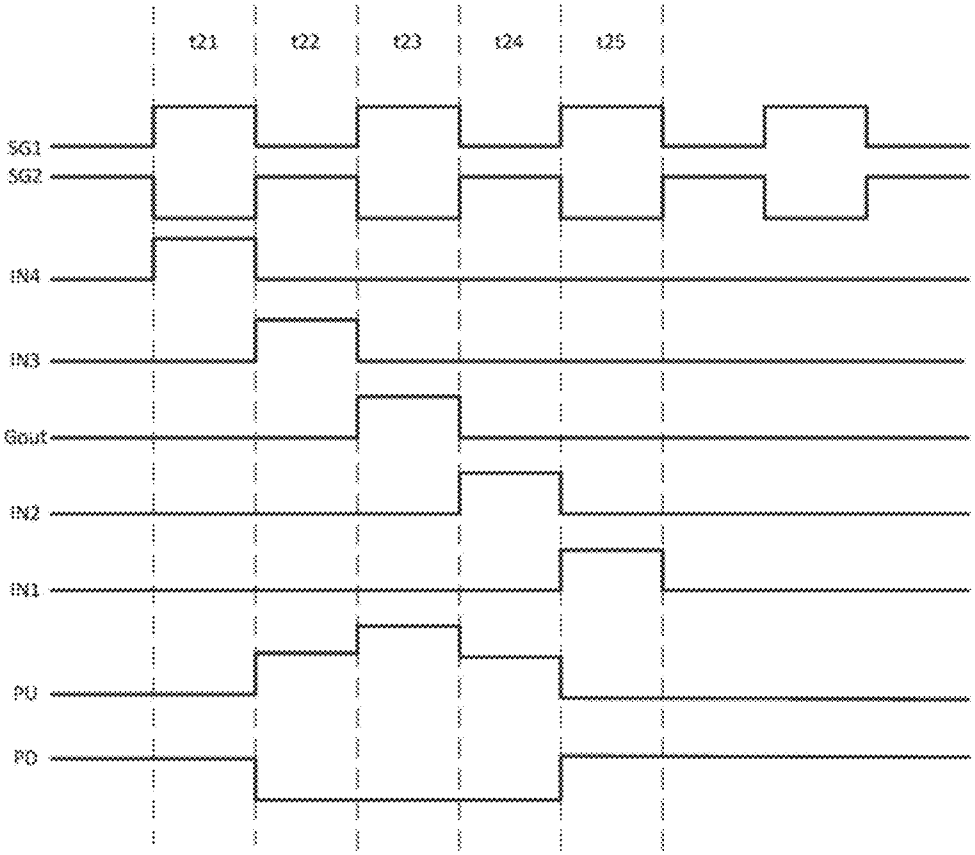
FIG. 8 is a schematic timing diagram of the shift register unit shown in FIG. 6 performing reverse scanning.

FIG. 7 is a schematic timing diagram of the shift register unit shown in FIG. 6 performing forward scanning, and FIG. 8 is a schematic timing diagram of the shift register unit shown in FIG. 6 performing reverse scanning. It should be noted that here, only the timing of one of the shift register units in the scanning circuit is described. The forward scanning timing of the shift register unit is shown in FIG. 7.

As shown in conjunction with FIGS. 6 and 7, the forward scanning operating process of the shift register unit 101 includes at least a first stage t11, a second stage t12, a third stage t13, a fourth stage t14, and fifth stage t15.

In the first stage t11, an electrical signal received by the first trigger terminal IN1 of the shift register unit 101 is a high-level signal, which turns on the first transistor M1, the first power supply signal VGL provided by the first power supply terminal PW1 is written into the pull-up node PU, the potential of the pull-up node PU is pulled down, the fifth transistor M5 is turned off, the potential of the first clock signal CK1 provided by the first signal terminal SG1 jumps from a low level to a high level, after being coupled via the second capacitor C2, the potential of the pull-down node PD is elevated based on the bootstrap effect of the second capacitor C2, the tenth transistor M10 and the eleventh transistor M11 are turned on, and the first power supply signal VGL provided by the first power supply terminal PW1 is written into the pull-up node PU and the drive output terminal Gout.

In the second stage t12, the electrical signal received by the first trigger terminal IN1 of the shift register unit 101 is a low-level signal, which turns off the first transistor M1, and the writing of the first power supply signal VGL into the pull-up node PU is stopped, an electrical signal received by the second trigger terminal IN2 is a high-level signal, which turns on the second transistor M2, the second power supply signal VGH provided by the second power supply terminal PW2 is written into the pull-up node PU, the potential of the pull-up node PU jumps from a low level to a high level, which turns on the fifth transistor M5, the potential of the first clock signal CK1 provided by the first signal terminal SG1 jumps from a high level to a low level, and the drive output terminal Gout outputs a low-level signal. At the same time, the ninth transistor M9 is turned on, the first power supply signal VGL provided by the first power supply terminal PW1 is written into the pull-down node PD, the potential of the pull-down node PD is pulled down, and the tenth transistor M10 and the eleventh transistor M11 are turned off.

In the third stage t13, the electrical signal received by the second trigger terminal IN2 of the shift register unit 101 is a low-level signal, which turns off the second transistor M2, then the pull-up node PU is in a floating state, the potential of the pull-up node PU maintains the high level in the second stage t12, the fifth transistor M5 remains turned-on, the potential of the first clock signal CK1 provided by the first signal terminal SG1 jumps from a low level to a high level, the drive output terminal Gout outputs a high-level signal to drive a corresponding row of sub-pixels, the low-level of the drive output terminal Gout jumps from a low-level signal to a high-level signal, and after being coupled via the first capacitor C1, the potential of the pull-up node PU is elevated based on the bootstrap effect of the first capacitor C1.

In the fourth stage t14, an electrical signal received by the third trigger terminal IN3 of the shift register unit 101 is a high-level signal, which turns on the third transistor M3, the second power supply signal VGH provided by the second power supply terminal PW2 is written into the pull-up node PU to maintain the high level of the pull-up node PU, the fifth transistor M5 remains turned-on, the first clock signal CK1 provided by the first signal terminal SG1 jumps from a high level to a low level, and the low-level of the first clock signal CK1 is written into the drive output terminal Gout.

In the fifth stage t15, an electrical signal received by the fourth trigger terminal IN4 of the shift register unit 101 is a high-level signal, which turns on the fourth transistor M4, the first power supply signal VGL provided by the first power supply terminal PW1 is written into the pull-up node PU, the potential of the pull-up node PU is pulled down, and the fifth transistor M5 switches from on to off. The potential of the first clock signal CK1 provided by the first signal terminal SG1 jumps from a low level to a high level, after being coupled via the second capacitor C2, the potential of the pull-down node PD is elevated based on the bootstrap effect of the second capacitor C2, the tenth transistor M10 and the eleventh transistor M11 are turned on, and the first power supply signal VGL provided by the first power supply terminal PW1 is written into the pull-up node PU and the drive output terminal Gout.

As described above, the drive output terminal of the shift register unit 101 outputs the high-level signal in the third stage t13. This high-level signal is a valid pulse signal used to scan and drive the corresponding row of sub-pixels. After the fifth stage t15, the shift register unit 101 keeps outputting a low-level signal until the first trigger terminal IN1 receives a high-level signal again.

As shown in conjunction with FIGS. 6 and 8, the reverse scanning operation process of the shift register unit 101 includes at least a first stage t21, a second stage t22, a third stage t23, a fourth stage t24 and a fifth stage t25.

In the first stage t21, the electrical signal received by the fourth trigger terminal IN4 of the shift register unit 101 is a high-level signal, which turns on the fourth transistor M4, the first power supply signal VGL provided by the first power supply terminal PW1 is written into the pull-up node PU, the potential of the pull-up node PU is pulled down, the fifth transistor M5 is turned off, the potential of the first clock signal CK1 provided by the first signal terminal SG1 jumps from a low level to a high level, after being coupled via the second capacitor C2, the potential of the pull-down node PD is elevated based on the bootstrap effect of the second capacitor C2, the tenth transistor M10 and the eleventh transistor M11 are turned on, and the first power supply signal VGL provided by the first power supply terminal PW1 is written into the pull-up node PU and the drive output terminal Gout.

In the second stage t22, the electrical signal received by the fourth trigger terminal IN4 of the shift register unit 101 is a low-level signal, which turns off the fourth transistor M4, the writing of the first power supply signal VGL into the pull-up node PU is stopped, the electrical signal received by the third trigger terminal IN3 is a high-level signal, which turns on the third transistor M3, the second power supply signal VGH provided by the second power supply terminal PW2 is written into the pull-up node PU, the potential of the pull-up node PU jumps from a low level to a high level, which turns on the fifth transistor M5, the potential of the first clock signal CK1 provided by the first signal terminal SG1 jumps from a high level to a low level, and the drive output terminal Gout outputs a low-level signal. At the same time, the ninth transistor M9 is turned on, the first power supply signal VGL provided by the first power supply terminal PW1 is written into the pull-down node PD, the potential of the pull-down node PD is pulled down, and the tenth transistor M10 and the eleventh transistor M11 are turned off.

In the third stage t23, the electrical signal received by the third trigger terminal IN3 of the shift register unit 101 is a low-level signal, which turns off the third transistor M3, the pull-up node PU is in a floating state, the potential of the pull-up node PU maintains the high level of the second stage t22, the fifth transistor M5 remains turned-on, the potential of the first clock signal CK1 provided by the first signal terminal SG1 jumps from a low level to a high level, the drive output terminal Gout outputs a high-level signal to drive a corresponding row of sub-pixels, the low-level signal of the drive output terminal Gout jumps to a high-level signal, after being coupled via the first capacitor C1, the potential of the pull-up node PU is elevated based on the bootstrap effect of the first capacitor C1.

In the fourth stage t24, the electrical signal received by the second trigger terminal IN2 of the shift register unit 101 is a high-level signal, which turns on the second transistor M2, the second power supply signal VGH provided by the second power supply terminal PW2 is written into the pull-up node PU to maintain the high level of the pull-up node PU, the fifth transistor M5 remains turned-on, the first clock signal CK1 provided by the first signal terminal SG1 jumps from a high level to a low level, and the low-level of the first clock signal CK1 is written into the drive output terminal Gout.

In the fifth stage t25, the electrical signal received by the first trigger terminal IN1 of the shift register unit 101 is a high-level signal, which turns on the first transistor M1, the first power supply signal VGL provided by the first power supply terminal PW1 is written into the pull-up node PU, the potential of the pull-up node PU is pulled down, and the fifth transistor M5 switches from on to off. The potential of the first clock signal CK1 provided by the first signal terminal SG1 jumps from a low level to a high level, after being coupled via the second capacitor C2, the potential of the pull-down node PD is elevated based on the bootstrap effect of the second capacitor C2, the tenth transistor M10 and the eleventh transistor M11 are turned on, and the first power supply signal VGL provided by the first power supply terminal PW1 is written into the pull-up node PU and the drive output terminal Gout.

As described above, the drive output terminal Gout of the shift register unit 101 outputs the high-level signal in the third stage t23, this high-level signal is a valid pulse signal used to scan and drive the corresponding row of sub-pixels. After the fifth stage t25, the shift register unit 101 keeps outputting a low-level signal until the fourth trigger terminal IN4 receives a high-level signal again.

It should be noted that the first electrode of the fifth transistor M5 is connected to the first signal terminal SG1, and the gate of the sixth transistor M6 is connected to the second signal terminal SG2, the first signal terminal SG1 receives the first clock signal CK1, the second signal terminal SG2 receives the second clock signal CK2, and since the first clock signal CK1 is different from the second clock signal CK2, a clock signal line connected to the first signal terminal SG1 is different from a clock signal line connected to the second signal terminal SG2.

In this embodiment, as shown in FIG. 6, the shift register unit 101 includes the forward and reverse scanning module S. The forward and reverse scanning module S includes the first transistor M1, the second transistor M2, the third transistor M3, and the fourth transistor M4. The first transistor M1 and the fourth transistor M4 pull down the potential of the pull-up node PU, and the second transistor M2 and the third transistor M3 pull up the potential of the pull-up node PU. The first electrode of the first transistor M1 is connected to the first power supply terminal PW1, the first electrode of the second transistor M2 is connected to the second power supply terminal PW2, the first electrode of the third transistor M3 is connected to the second power supply terminal PW2, and the first electrode of the fourth transistor M4 is connected to the first power supply terminal PW1. The second electrodes of the first transistor M1, the second transistor M2, the third transistor M3, and the fourth transistor M4 are all connected to the pull-up node PU. During a forward scanning process, the first transistor M1 and the fourth transistor M4 pull down the potential of the pull-up node PU, and the second transistor M2 and the third transistor M3 pull up the potential of the pull-up node PU. During a reverse scanning process, it remains that the first transistor M1 and the fourth transistor M4 pull down the potential of the pull-up node PU, and the second transistor M2 and the third transistor M3 pull up the potential of the pull-up node PU. Therefore, after switching between the forward scanning mode and reverse scanning mode, the roles of the first transistor M1, the second transistor M2, the third transistor M3, and the fourth transistor M4 do not change, and there is no need to switch the first power supply signal VGL and the second power supply signal VGH based on the scanning direction. The first transistor M1 and the fourth transistor M4 undergoing a positive threshold voltage drift do not need to perform the pull-up action on the pull-up node PU after the scanning mode is switched. As a result, the shift register unit 101 can normally switch to the reverse scanning mode after a long-term forward scanning, or switch to the forward scanning mode after a long-term reverse scanning. Based on this, a display panel can perform forward scanning and reverse scanning, and switch between forward scanning and reverse scanning, which solves the problems in the related art.

Optionally, the scanning circuit 100 includes the X stages of shift register units 101 in cascade, and each stage of shift register unit includes at least one shift output terminal Gx. Stages of shift register units are cascaded through the shift output terminals Gx. A signal output by the shift output terminal Gx and a signal output by the drive output terminal Gout are the same. In some embodiments, the shift output terminal Gx and the drive output terminal Gout are separated from each other. In this embodiment, the drive output terminal Gout is reused as the shift output terminal Gx, as shown in FIG. 6. That is, on the one hand, the shift register unit 101 outputs the signal through the drive output terminal Gout to drive corresponding sub-pixels, and on the other hand, the shift register unit 101 is also cascaded through the drive output terminal Gout.

Optionally, the scanning circuit 100 further includes Y clock signal lines and k*Y trigger lines, where $k \geq 1$ and $Y \geq 2$. Among the Y clock signal lines, clock signals provided by any two clock signal lines have a same frequency and different phases. Optionally, as shown in FIG. 6, the first trigger terminal IN1 of the nth stage of shift register unit is connected to the shift output terminal Gx or the trigger line of the (n−2i)th stage of shift register unit, the second trigger terminal IN2 of the nth stage of shift register unit is connected to the shift output terminal Gx or the trigger line of the (n−i)th stage of shift register unit, the third trigger terminal IN3 of the nth stage of shift register unit is connected to the shift output terminal Gx or the trigger line of the (n+i)th stage of shift register unit, and the fourth trigger terminal IN4 of the nth stage of shift register unit is connected to the shift output terminal Gx or the trigger line of the (n+2i)th stage of shift register unit, where $n \leq X$ and $i \geq 1$.

In this embodiment, the scanning circuit can be driven bilaterally or unilaterally. It can be understood that for the same clock signal line, the clock signal provided by it during forward scanning may be different from clock signal provided by it during reverse scanning. For the same trigger line, the trigger signal provided by it during forward scanning may be different from the trigger signal provided by it during reverse scanning.

Figure 9:
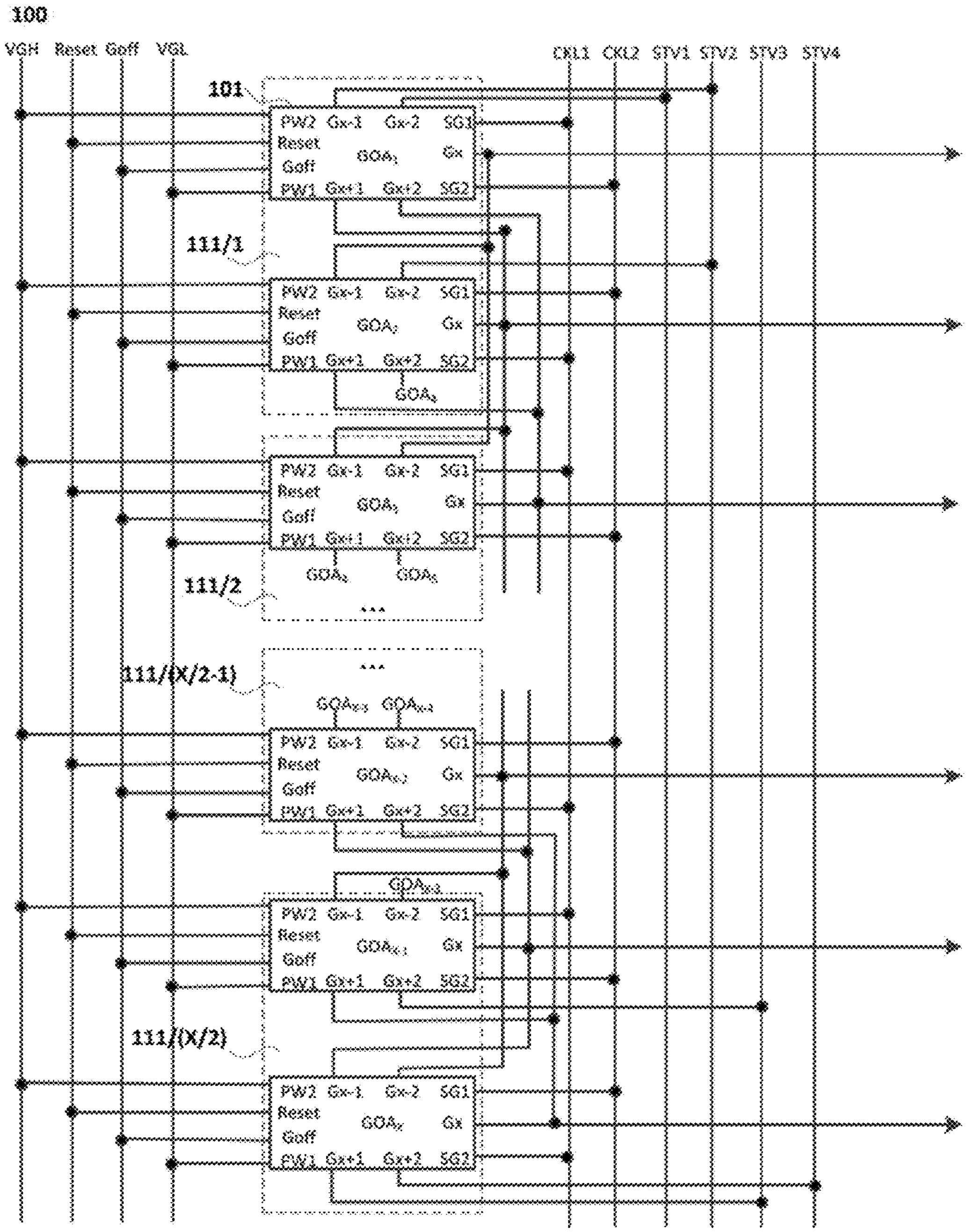
FIG. 9 is a schematic diagram of a scanning circuit provided by an embodiment of the present application.

FIG. 9 is a schematic diagram of a scanning circuit 100 provided by an embodiment of the present application. As shown in FIG. 9, the unilateral structure of this scanning circuit is a 2phase GOA structure. Optionally, the scanning circuit 100 includes: two clock signal lines, namely a first clock signal line CKL1 and a second clock signal line CKL2; and four trigger lines, namely a first trigger line STV1, a second trigger line STV2, a third trigger line STV3, and a fourth trigger line STV4.

In the scanning circuit 100, the X stages of shift register units 101 are sequentially labeled as $GOA_1$, $GOA_2$, $GOA_3$, $GOA_4$, . . . , $GOA_X$, and the nth stage of shift register unit 101 is labeled as $GOA_n$, where $1 \leq n \leq X$. Two adjacent shift register units 101 form a shift register unit group 111. For example, the shift register unit $GOA_1$ and the shift register unit $GOA_2$ form the first stage of shift register unit group 111/1, the shift register unit $GOA_3$ and the shift register unit $GOA_4$ form the second stage of shift register unit group 111/2, and so on. Therefore, the scanning circuit 100 includes X/2 shift register unit groups 111 in cascade. In FIG. 9, only the first stage of shift register unit group 111/1, a part of the second stage of shift register unit group 111/2, a part of the (X/2−1)th stage of shift register unit group 111/(X/2−1), and the (X/2)th stage of shift register unit group 111/(X/2) of the scanning circuit 100 are schematically illustrated.

For any stage of shift register unit group 111, the two adjacent shift register units 101 included therein are respectively labeled as the first stage of shift register unit GOA−1 and the second stage of shift register unit GOA−2 of the shift register unit group 111. For example, the shift register unit $GOA_1$ is the first stage of shift register unit GOA−1 of the first stage of shift register unit group 111/1, and the shift register unit $GOA_2$ is the second stage of shift register unit GOA−2 of the first stage of shift register unit group 111/1; the shift register unit $GOA_3$ is the first stage of shift register unit GOA−1 of the second stage of shift register unit group 111/2, and the shift register unit $GOA_4$ is the second stage of shift register unit GOA−2 of the second stage of shift register unit group 111/2, and so on.

As shown in FIG. 9, the shift register unit groups meet the following conditions: a first clock signal CKL1 is connected to the first signal terminal SG1 of the first stage of shift register unit GOA−1 of each stage of shift register unit group 111 and the second signal terminal SG2 of the second stage of shift register unit GOA−2 of each stage of shift register unit group 111; a second clock signal CKL2 is connected to the second signal terminal SG2 of the first stage of shift register unit GOA−1 of each stage of shift register unit group 111 and the first signal terminal SG1 of the second stage of shift register unit GOA−2 of each stage of shift register unit group 111. The scanning circuit 100 includes the forward scanning mode and the reverse scanning mode. In particular, the forward scanning mode can be scanning along a direction from $GOA_1$ to $GOA_X$, and correspondingly, the reverse scanning mode can be scanning along a direction from $GOA_X$ to $GOA_1$.

When the scanning circuit performs forward scanning or reverse scanning, the operating timing of the first stage of shift register unit GOA−1 of any stage of shift register unit group 111 is as follows: the first clock signal CK1 received by the first signal terminal SG1 is derived from the first clock signal line CKL1, and the second clock signal CK2 received by the second signal terminal SG2 is derived from the second clock signal line CKL2. The operating timing of the second stage of shift register unit GOA-2 of any stage of shift register unit group 111 is as follows: the first clock signal CK1 received by the first signal terminal SG1 is derived from the second clock signal line CKL2, and the second clock signal CK2 received by the second signal terminal SG2 is derived from the second clock signal line CKL1. It can be understood that in this embodiment, the clock signals provided by the first clock signal line CKL1 and the second clock signal line CKL2 have a same frequency and opposite phases, and when switching between the forward scanning mode and reverse scanning mode, the timings of the clock signals provided by the first clock signal line CKL1 and the second clock signal line CKL2 can be switched with each other.

Optionally, as shown in FIG. 9, the first trigger terminal IN1 of the nth stage of shift register unit 101 is connected to the shift output terminal Gx of the (n−2)th stage of shift register unit 101, the second trigger terminal IN2 of the nth stage of shift register unit 101 is connected to the shift output terminal Gx of the (n−1)th stage of shift register unit 101, the third trigger terminal IN3 of the nth stage of shift register unit 101 is connected to the shift output terminal Gx of the (n+1)th stage of shift register unit 101, and the fourth trigger terminal IN4 of the nth stage of shift register unit 101 is connected to the shift output terminal Gx of the (n+2)th stage of shift register unit 101. For the case where n is less than or equal to 2, that is, the first stage of shift register unit $GOA_1$ and the second stage of shift register unit $GOA_2$ are included, optionally, the signals received by the first trigger terminal IN1 and the second trigger terminal IN2 of the first stage of shift register unit $GOA_1$ and the first trigger terminal IN1 of the second stage of shift register unit $GOA_2$ can directly come from the STV trigger lines. For example, the first trigger line STV1 can directly provide an electrical signal to the first trigger terminal IN1 of the first stage of shift register unit $GOA_1$, and the second trigger line STV2 can directly provide an electrical signal to the second trigger terminal IN2 of the first stage of shift register unit $GOA_1$ and the first trigger terminal IN1 of the second stage of shift register unit $GOA_2$. For the last two stages of GOA units 101, that is, the (X−1)th stage of shift register unit $GOA_{X-1}$ and the Xth stage of shift register unit $GOA_X$, optionally, the signals received by the fourth trigger terminal IN4 of the (X−1)th stage of shift register unit $GOA_{X-1}$ as well as the third trigger terminal IN3 and the fourth trigger terminal IN4 of the Xth stage of shift register unit $GOA_X$ can directly come from the STV trigger lines. For example, the third trigger line STV3 can directly provide an electrical signal to the fourth trigger terminal IN4 of the (X−1)th stage of shift register unit $GOA_{X-1}$ and the third trigger terminal IN3 of the Xth stage of shift register unit $GOA_X$, and the fourth trigger line STV4 can directly provide an electrical signal to the fourth trigger terminal IN4 of the Xth stage of shift register unit $GOA_X$. However, this is not a limitation. In other embodiments, optionally, two stages of dummy shift register units, which are labeled as dummy-$GOA_1$ and dummy-$GOA_2$ respectively, can be further provided before the first stage of shift register unit $GOA_1$. The dummy-$GOA_1$ can directly provide an electrical signal to the first trigger terminal IN1 of the first stage of shift register unit $GOA_1$, and the dummy-$GOA_2$ can provide an electrical signal to the second trigger terminal IN2 of the first stage of shift register unit $GOA_1$ and the first trigger terminal IN1 of the second stage of shift register unit $GOA_2$. Similarly, two stages of dummy shift register units, which are labeled as dummy-$GOA_{X-1}$ and dummy-$GOA_X$ respectively, can be provided after the Xth stage of shift register unit $GOA_X$. The dummy-$GOA_{X-1}$ can directly provide an electrical signal to the fourth trigger terminal IN4 of the (X−1)th stage of shift register unit $GOA_{X-1}$ and the third trigger terminal IN3 of the Xth stage of shift register unit $GOA_X$, and the dummy-$GOA_X$ can directly provide an electrical signal to the fourth trigger terminal IN4 of the Xth stage of shift register unit $GOA_X$.

Figure 10:
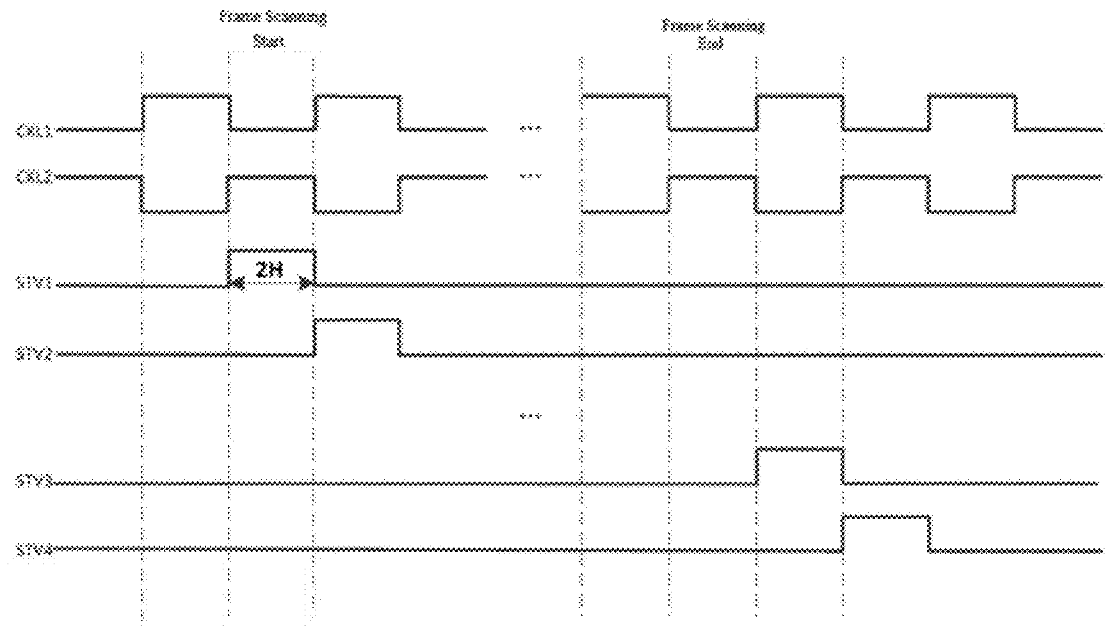
FIG. 10 is a schematic diagram of clock signals and trigger signals when the scanning circuit shown in FIG. 9 is in a forward scanning mode.

Optionally, the scanning circuit 100 includes the forward scanning mode and the reverse scanning mode. FIG. 10 is a schematic diagram of clock signals and trigger signals when the scanning circuit 100 shown in FIG. 9 is in the forward scan mode. As shown in FIG. 10, in the forward scanning mode, the clock signal provided by the first clock signal line CKL1 and the clock signal provided by the second clock signal line CKL2 have a same frequency and opposite phases. At a frame scanning start phase, the phase of the trigger signal provided by the first trigger signal line STV1 is earlier than the phase of the trigger signal provided by the second trigger signal line STV2, and the phase difference between them is 2*H. At a frame scanning end phase, the phase of the trigger signal provided by the third trigger signal line STV3 is earlier than the phase of the trigger signal provided by the fourth trigger signal line STV4, and the phase difference between them is 2*H.

Figure 11:
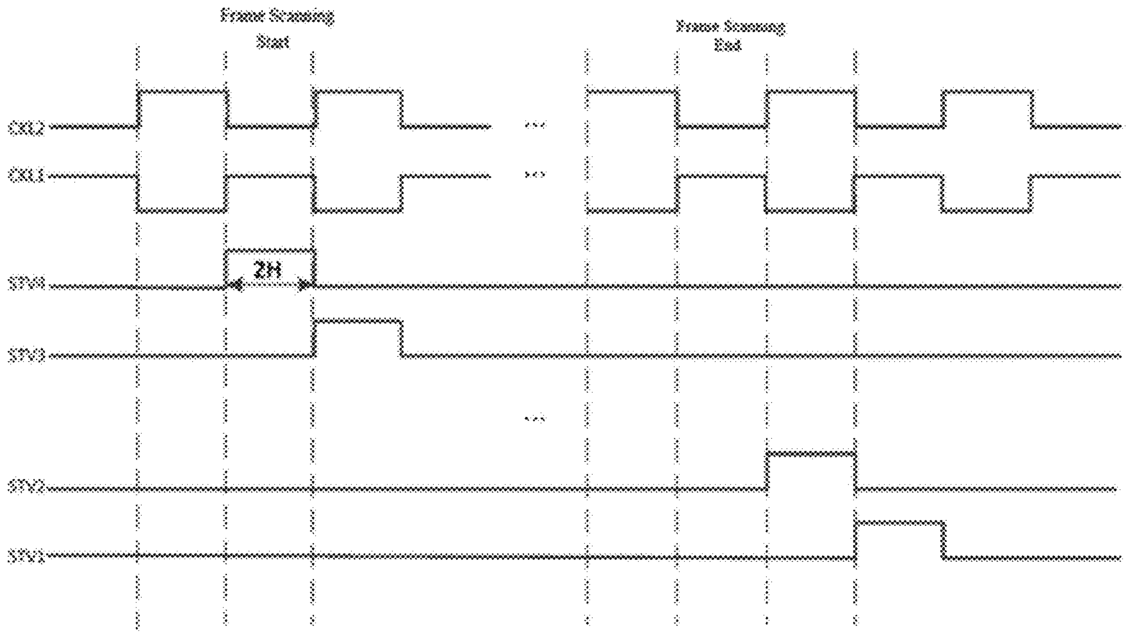
FIG. 11 is a schematic diagram of clock signals and trigger signals when the scanning circuit shown in FIG. 9 in a reverse scanning mode.

FIG. 11 is a schematic diagram of clock signals and trigger signals when the scanning circuit 100 shown in FIG. 9 is in the reverse scanning mode. As shown in FIG. 11, in the reverse scanning mode, the clock signal provided by the first clock signal line CKL1 and the clock signal provided by the second clock signal line CKL2 have a same frequency and opposite phases. At a frame scanning start phase, the phase of the trigger signal provided by the fourth trigger signal line STV4 is earlier than the phase of the trigger signal provided by the third trigger signal line STV3, and the phase difference between them is 2*H. At a frame scanning end phase, the phase of the trigger signal provided by the second trigger signal line STV2 is earlier than the phase of the trigger signal provided by the first trigger signal line STV1, and the phase difference between them is 2*H.

Figure 12:
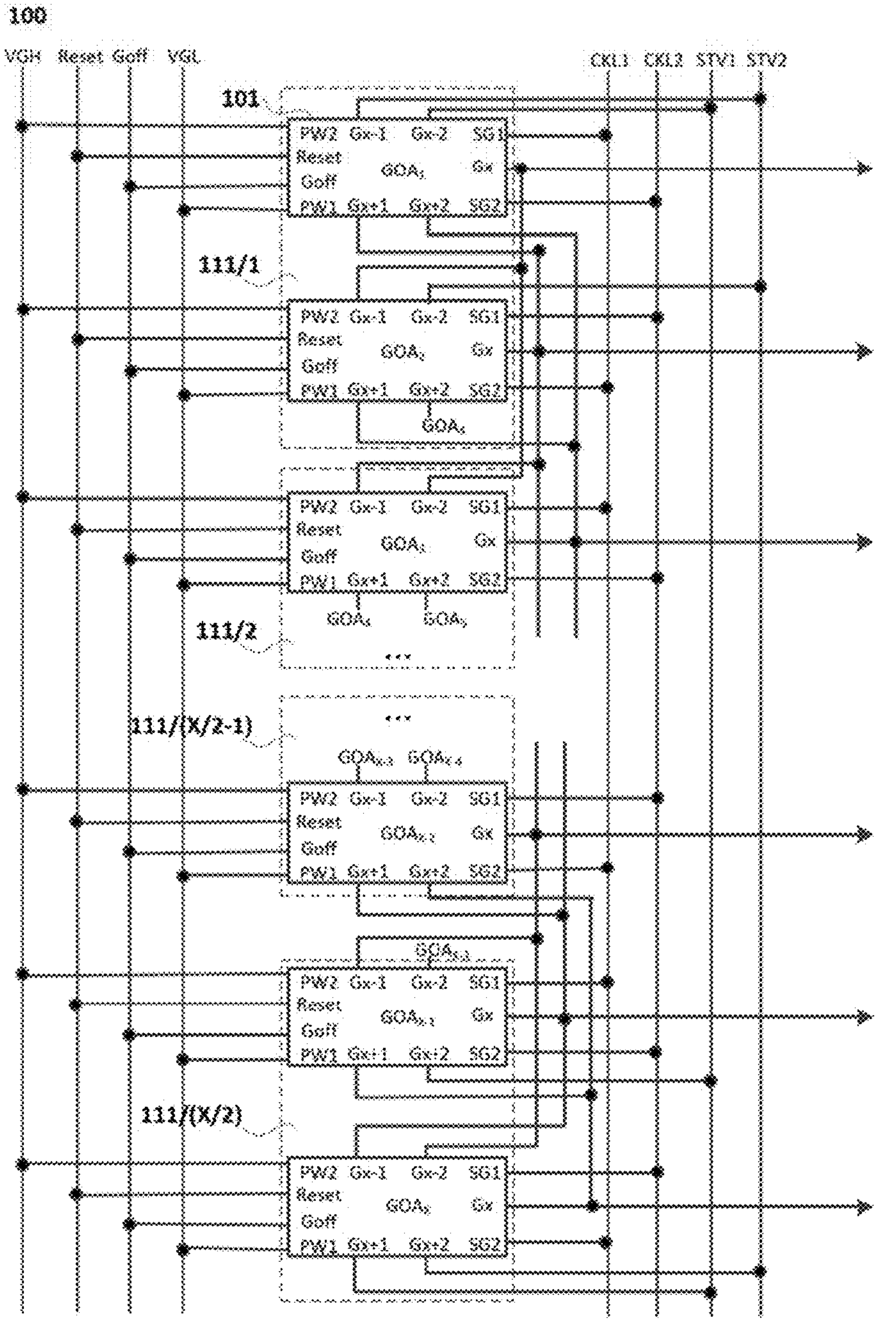
FIG. 12 is a schematic diagram of another scanning circuit provided by an embodiment of the present application.
Figure 13:
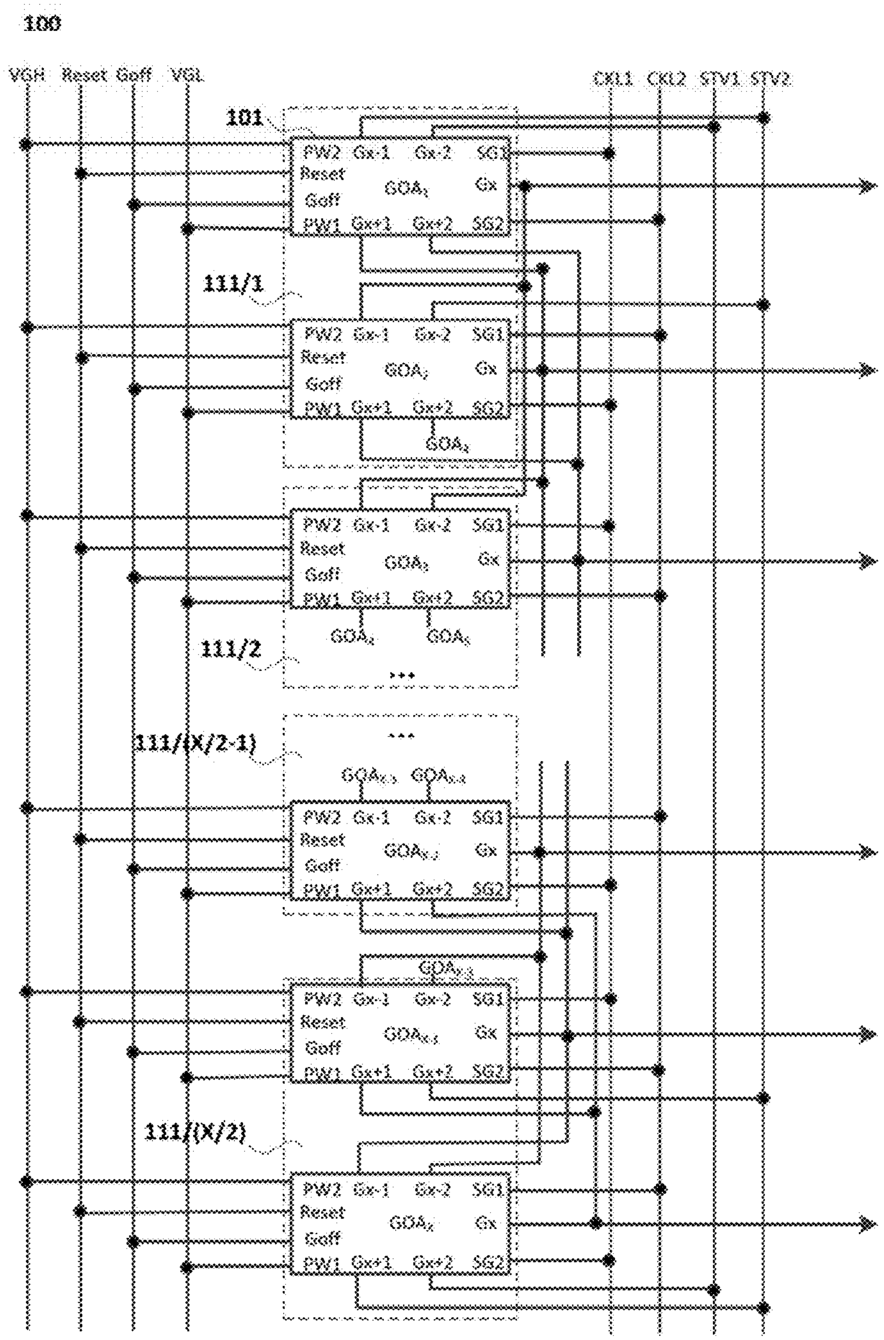
FIG. 13 is a schematic diagram of yet another scanning circuit provided by an embodiment of the present application.

In further embodiments, FIG. 12 is a schematic diagram of another scanning circuit provided by an embodiment of the present application. As shown in FIG. 12, the scanning circuit 100 may include: two clock signal lines, namely a first clock signal line CKL1 and a second clock signal line CKL2; and two trigger lines, namely a first trigger line STV1 and a second trigger line STV2. That is, in the scanning circuit shown in FIG. 9, the first trigger line STV1 is reused as the third trigger line STV3, and the second trigger line STV2 is reused as the fourth trigger line STV4. As shown in FIG. 12, the first trigger terminal IN1 of the first stage of shift register unit $GOA_1$ of the scanning circuit 100 is connected to the first trigger line STV1, and the second trigger terminal IN2 of the first stage of shift register unit $GOA_1$ is connected to the second trigger line; and the first trigger terminal IN1 of the second stage of shift register unit $GOA_2$ is connected to the second trigger line STV2, and the second trigger terminal IN2 of the second stage of shift register unit $GOA_2$ is connected to the shift output terminal Gx of the first stage of shift register unit GOAL. The third trigger terminal IN3 of the (X−1)th stage of shift register unit $GOA_{X-1}$ is connected to the shift output terminal Gx of the Xth stage of shift register unit $GOA_X$, the fourth trigger terminal IN4 of the (X−1)th stage of shift register unit $GOA_{X-1}$ is connected to the first trigger line STV1, the third trigger terminal IN3 of the Xth stage of shift register unit $GOA_X$ is connected to the first trigger line STV1, and the fourth trigger terminal IN4 of the Xth stage of shift register unit $GOA_X$ is connected to the second trigger line STV2. Or, as shown in FIG. 13, which is a schematic diagram of yet another scanning circuit 100 provided by an embodiment of the present application, the third trigger terminal IN3 of the (X−1)th stage of shift register unit $GOA_{X-1}$ is connected to the shift output terminal Gx of the Xth stage of shift register unit $GOA_X$, the fourth trigger terminal IN4 of the (X−1)th stage of shift register unit $GOA_{X-1}$ is connected to the second trigger line STV2, the third trigger terminal IN2 of the Xth stage of shift register unit $GOA_X$ is connected to the second trigger line ST21, and the fourth trigger terminal IN4 of the Xth stage of shift register unit $GOA_X$ is connected to the first trigger line STV1. That is, in the scanning circuit shown in FIG. 9, the first trigger line STV1 is reused as the third trigger line STV3, and the second trigger line STV2 is reused as the fourth trigger line STV4. With such setting, two trigger lines can be reduced and the frame of the array substrate can be reduced.

Figure 14:
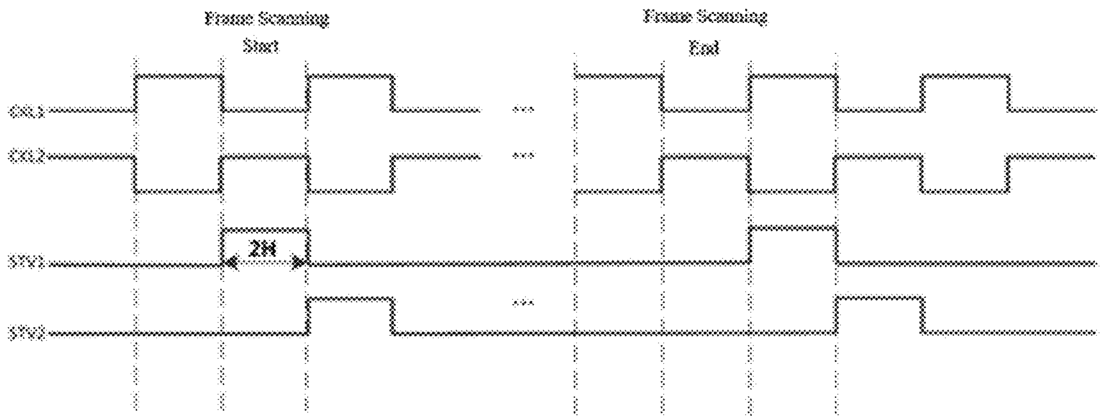
FIG. 14 is a schematic diagram of clock signals and trigger signals when the scanning circuit shown in FIG. 12 is in a forward scanning mode.

FIG. 14 is a schematic diagram of clock signals and trigger signals when the scanning circuit shown in FIG. 12 is in the forward scanning mode. As shown in FIG. 14, in the forward scanning mode, the clock signal provided by the first clock signal line CKL1 and the clock signal provided by the second clock signal line CKL2 have a same frequency and opposite phases. At a frame scanning start phase, the phase of the trigger signal provided by the first trigger signal line STV1 is earlier than the phase of the trigger signal provided by the second trigger signal line STV2, and the phase difference between them is 2*H. At a frame scanning end phase, the phase of the trigger signal provided by the first trigger signal line STV1 is earlier than the phase of the trigger signal provided by the second trigger signal line STV2, and the phase difference between them is 2*H.

Figure 15:
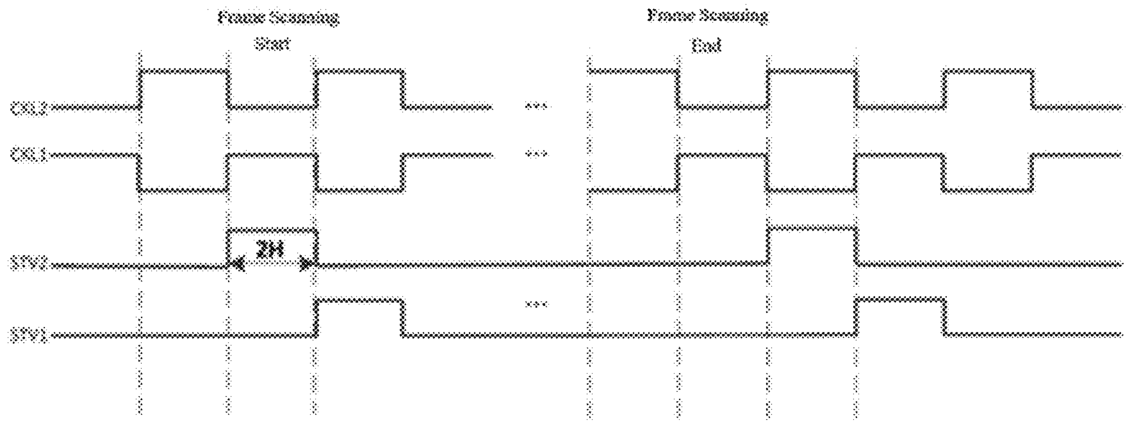
FIG. 15 is a schematic diagram of clock signals and trigger signals when the scanning circuit shown in FIG. 12 is in a reverse scanning mode.

FIG. 15 is a schematic diagram of clock signals and trigger signals when the scanning circuit shown in FIG. 12 is in the reverse scanning mode. As shown in FIG. 15, in the reverse scanning mode, the clock signal provided by the first clock signal line CKL1 and the clock signal provided by the second clock signal line CKL2 have a same frequency and opposite phases. Unlike what is shown in FIG. 14, the phase of the clock signal provided by the first clock signal line CKL1 and the phase of the clock signal provided by the second clock signal line CKL2 are switched with each other. That is, the clock signal provided by the first clock signal line CKL1 and the clock signal provided by the second clock signal line CKL2 shown in FIG. 14 have a same phase, and the clock signal provided by the second clock signal line CKL2 and the clock signal provided by the first clock signal line CKL1 shown in FIG. 14 have a same phase. At a frame scanning start phase, the phase of the trigger signal provided by the second trigger signal line STV2 is earlier than the phase of the trigger signal provided by the first trigger signal line STV1, and the phase difference between them is 2*H. At a frame scanning end phase, the phase of the trigger signal provided by the second trigger signal line STV2 is earlier than the phase of the trigger signal provided by the first trigger signal line STV1, and the phase difference between them is 2*H.

Figure 16:
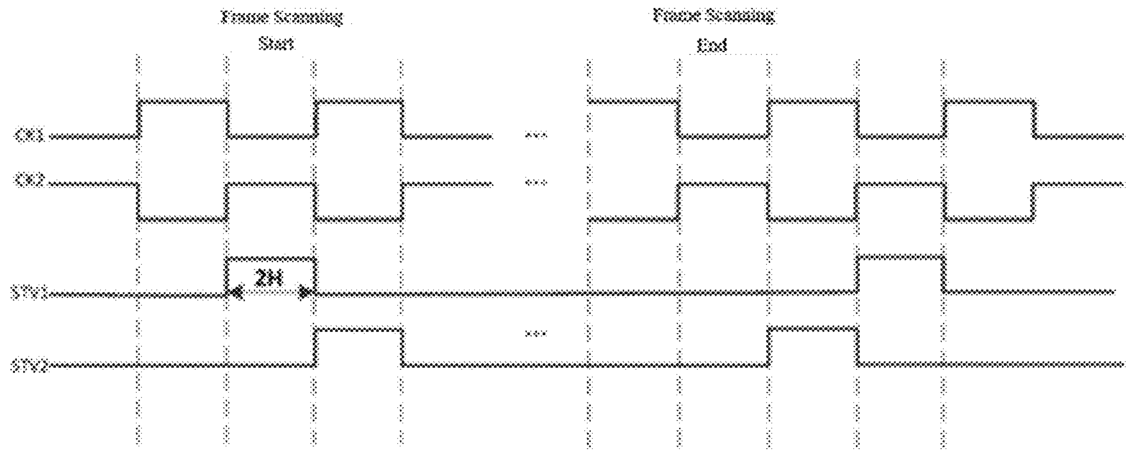
FIG. 16 is a schematic diagram of clock signals and trigger signals when the scanning circuit shown in FIG. 13 is in a forward scanning mode.

FIG. 16 is a schematic diagram of clock signals and trigger signals when the scanning circuit shown in FIG. 13 is in the forward scanning mode. As shown in FIG. 16, in the forward scanning mode, the clock signal provided by the first clock signal line CKL1 and the clock signal provided by the second clock signal line CKL2 have a same frequency and opposite phases. At a frame scanning start phase, the phase of the trigger signal provided by the first trigger signal line STV1 is earlier than the phase of the trigger signal provided by the second trigger signal line STV2, and the phase difference between them is 2*H. At a frame scanning end phase, the phase of the trigger signal provided by the first trigger signal line STV1 is later than the phase of the trigger signal provided by the second trigger signal line STV2, and the phase difference between them is 2*H.

Figure 17:
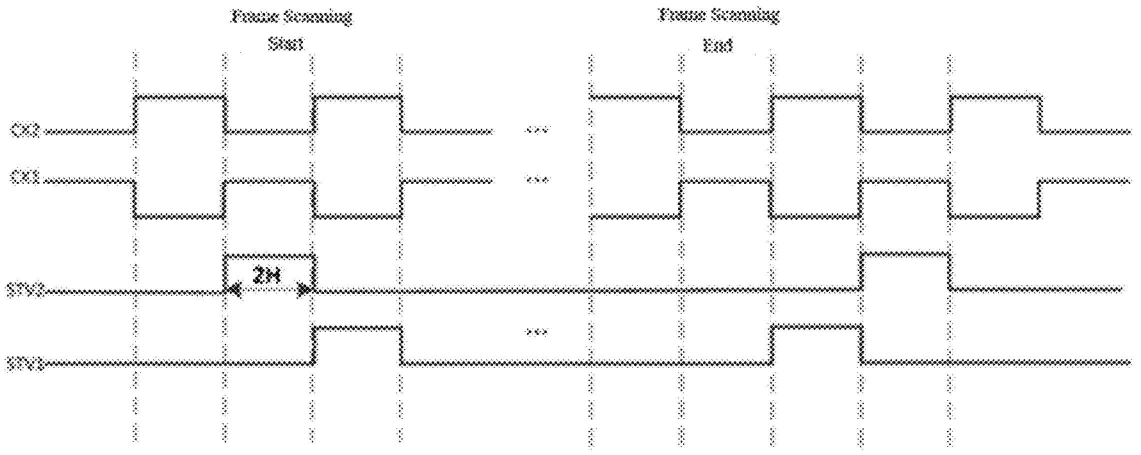
FIG. 17 is a schematic diagram of clock signals and trigger signals when the scanning circuit shown in FIG. 13 is in a reverse scanning mode.

FIG. 17 is a schematic diagram of clock signals and trigger signals when the scanning circuit shown in FIG. 13 is in the reverse scanning mode. As shown in FIG. 17, in the reverse scanning mode, the clock signal provided by the first clock signal line CKL1 and the clock signal provided by the second clock signal line CKL2 have a same frequency and opposite phases. Unlike what is shown in FIG. 16, the phase of the clock signal provided by the first clock signal line CKL1 and the phase of the clock signal provided by the second clock signal line CKL2 are switched with each other. That is, the clock signal provided by the first clock signal line CKL1 and the clock signal provided by the second clock signal line CKL2 in FIG. 16 have a same phase, and the clock signal provided by the second clock signal line CKL2 and the clock signal provided by the first clock signal line CKL1 in FIG. 16 have a same phase. At a frame scanning start phase, the phase of the trigger signal provided by the second trigger signal line STV2 is earlier than the phase of the trigger signal provided by the first trigger signal line STV1, and the phase difference between them is 2*H. At a frame scanning end phase, the phase of the trigger signal provided by the second trigger signal line STV2 is later than the phase of the trigger signal provided by the first trigger signal line STV1, and the phase difference between them is 2*H.

Figure 18:
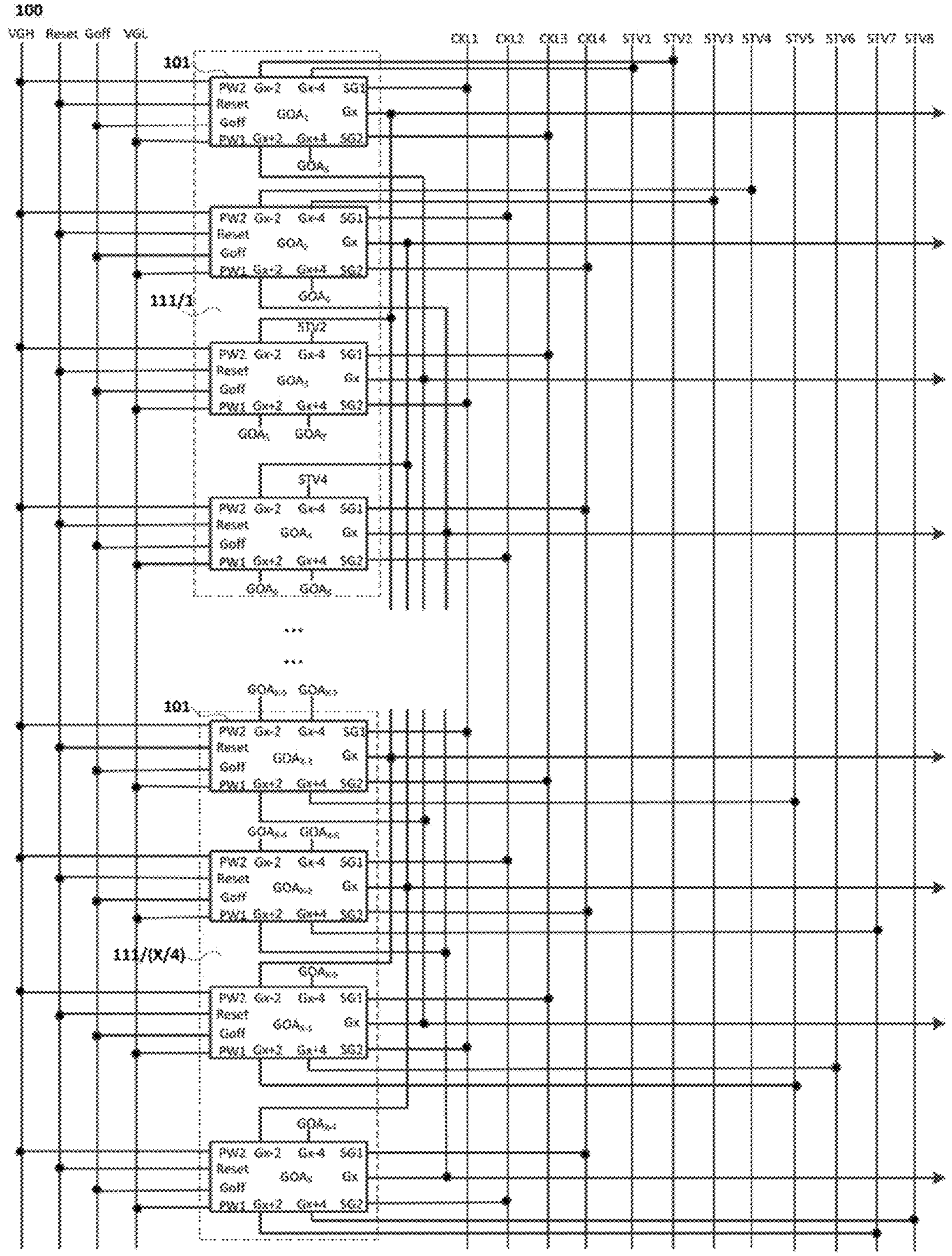
FIG. 18 is a schematic diagram of a further scanning circuit provided by an embodiment of the present application.

FIG. 18 is a schematic diagram of a further scanning circuit provided by an embodiment of the present application. As shown in FIG. 18, the unilateral structure of this scanning circuit 300 is a 4phase GOA structure. Optionally, Y clock signal lines include a first clock signal line CKL1, a second clock signal line CKL2, a third clock signal line CKL3, and a fourth clock signal line CKL4. Optionally, k*Y trigger lines include a first trigger line STV1 to an eighth trigger line STV8, where $k \geq 1$ and $Y \geq 2$. The scanning circuit 100 includes X stages of shift register units 101. In the scanning circuit 100, the X stages of shift register units 101 are sequentially labeled as $GOA_1$, $GOA_2$, $GOA_3$, $GOA_4$, . . . , $GOA_X$, and the nth stage of shift register unit 101 is labeled as $GOA_n$. Four adjacent shift register units 101 form a shift register unit group 111. For example, the shift register unit $GOA_1$, the shift register unit $GOA_2$, the shift register unit $GOA_3$, and the shift register unit $GOA_4$ form the first stage of shift register unit group 111/1; the shift register unit $GOA_5$, the shift register unit $GOA_6$, the shift register unit $GOA_7$, and the shift register unit $GOA_5$ form the second stage of shift register unit group 111/2, and so on. Therefore, the scanning circuit 100 includes X/4 shift register unit groups 111 in cascade. In FIG. 18, only the first stage of shift register unit group 111/1 and the (X/4)th stage of shift register unit group 111/(X/4) of the scanning circuit 100 are schematically illustrated.

For any stage of shift register unit group 111, the four adjacent shift register units 101 included therein are respectively labeled as the first stage of shift register unit GOA−1, the second stage of shift register unit GOA−2, the third stage of shift register unit GOA−3, and the fourth stage of shift register unit GOA−4 of the shift register unit group 111. For example, the shift register unit $GOA_1$ is the first stage of shift register unit GOA−1 of the first stage of shift register unit group 111/1, the shift register unit $GOA_2$ is the second stage of shift register unit GOA−2 of the first stage of shift register unit group 111/1, the shift register unit $GOA_3$ is the third stage of shift register unit GOA−3 of the first stage of shift register unit group 111/1, and the shift register unit $GOA_4$ is the fourth stage of shift register unit GOA−4 of the first stage of shift register unit group 111/1; the shift register unit $GOA_5$ is the first stage of shift register unit GOA−1 of the second stage of shift register unit group 111/2, the shift register unit $GOA_6$ is the second stage of shift register unit GOA−2 of the second stage of shift register unit group 111/2, the shift register unit $GOA_7$ is the third stage of shift register unit GOA−3 of the second stage of shift register unit group 111/2, and the shift register unit $GOA_5$ is the fourth stage of shift register unit GOA−4 of the second stage of shift register unit group 111/2, and so on.

As shown in FIG. 18, the shift register unit groups meet the following conditions:

a first clock signal CKL1 is connected to the first signal terminal SG1 of the first stage of shift register unit GOA−1 of each stage of shift register unit group 111 and the second signal terminal SG2 of the third stage of shift register unit GOA−3 of each stage of shift register unit group 111;

a second clock signal CKL2 is connected to the first signal terminal SG1 of the second stage of shift register unit GOA−2 of each stage of shift register unit group 111 and the second signal terminal SG2 of the fourth stage of shift register unit GOA−4 of each stage of shift register unit group 111;

a third clock signal CKL3 is connected to the first signal terminal SG1 of the third stage of shift register unit GOA−3 of each stage of shift register unit group 111 and the second signal terminal SG2 of the first stage of shift register unit GOA−1 of each stage of shift register unit group 111; and a fourth clock signal CKL4 is connected to the first signal terminal SG1 of the fourth stage of shift register unit GOA−4 of each stage of shift register unit group 111 and the second signal terminal SG2 of the second stage of shift register unit GOA−2 of each stage of shift register unit group 111.

The scanning circuit 100 includes the forward scanning mode and the reverse scanning mode. In particular, the forward scanning mode can be scanning along the direction from $GOA_1$ to $GOA_X$, and correspondingly, the reverse scanning mode can be scanning along the direction from $GOA_X$ to $GOA_1$.

When the scanning circuit 100 performs forward scanning or reverse scanning:

the operating timing of the first stage of shift register unit GOA−1 of any stage of shift register unit group 111 is as follows: the first clock signal CK1 received by the first signal terminal SG1 is derived from the first clock signal line CKL1, and the second clock signal CK2 received by the second signal terminal SG2 is derived from the third clock signal line CKL3;

the operating timing of the second stage of shift register unit GOA−2 of any stage of shift register unit group 111 is as follows: the first clock signal CK1 received by the first signal terminal SG1 is derived from the second clock signal line CKL2, and the second clock signal CK2 received by the second signal terminal SG2 is derived from the fourth clock signal line CKL4;

the operating timing of the third stage of shift register unit GOA−3 of any stage of shift register unit group 111 is as follows: the first clock signal CK1 received by the first signal terminal SG1 is derived from the third clock signal line CKL3, and the second clock signal CK2 received by the second signal terminal SG2 is derived from the first clock signal line CKL1; and the operating timing of the fourth stage of shift register unit GOA−4 of any stage of shift register unit group 111 is as follows: the first clock signal CK1 received by the first signal terminal SG1 is derived from the fourth clock signal line CKL4, and the second clock signal CK2 received by the second signal terminal SG2 is derived from the second clock signal line CKL2.

As shown in FIG. 18, optionally, the first trigger terminal IN1 of the nth stage of shift register unit is connected to the shift output terminal Gx of the (n−4)th stage of shift register unit 101. The second trigger terminal IN2 of the nth stage of shift register unit 101 is connected to the shift output terminal Gx of the (n−2)th stage of shift register unit 101. The third trigger terminal IN3 of the nth stage of shift register unit 101 is connected to the shift output terminal Gx of the (n+2)th stage of shift register unit 101. The fourth trigger terminal IN4 of the nth stage of shift register unit 101 is connected to the shift output terminal Gx of the (n+4)th stage of shift register unit 101. For the case where n is less than or equal to 4, that is, the shift register unit $GOA_1$ to the shift register units $GOA_4$ are included, the signals received by the first trigger terminals IN1 of the shift register unit $GOA_1$ to the shift register unit $GOA_4$ can directly come from the trigger lines STV. Also, the signals received by the second trigger terminals IN2 of the shift register unit $GOA_1$ and the shift register unit $GOA_2$ can directly come from the trigger lines STV. For example, the first trigger line STV1 can directly provide an electrical signal to the first trigger terminal IN1 of the first stage of shift register unit $GOA_1$, the second trigger line STV2 can provide an electrical signal to the second trigger terminal IN2 of the first stage of shift register unit $GOA_1$ and the first trigger terminal IN4 of the third stage of shift register unit $GOA_3$, the third trigger line STV3 can directly provide an electrical signal to the first trigger terminal IN1 of the second stage of shift register unit $GOA_2$, and the fourth trigger line STV4 can directly provide an electrical signal to the second trigger terminal IN2 of the second stage of shift register unit $GOA_2$ and the first trigger terminal IN1 of the fourth stage of shift register unit $GOA_4$. However, this is not a limitation. In further embodiments, four stages of dummy shift register units, which are labeled as dummy-$GOA_1$, dummy-$GOA_2$, dummy-$GOA_3$, and dummy-$GOA_4$ respectively, can optionally be provided before the shift register unit $GOA_1$. The dummy-$GOA_1$ provides an electrical signal to the first trigger terminal IN1 of the first stage of shift register unit GOAL. The dummy-$GOA_2$ can provide an electrical signal to the second trigger terminal IN2 of the first stage of shift register unit $GOA_1$ and the first trigger terminal IN1 of the third stage of shift register unit $GOA_3$. The dummy-$GOA_3$ can directly provide an electrical signal to the first trigger terminal IN1 of the second stage of shift register unit $GOA_2$. The dummy-$GOA_4$ can directly provide an electrical signal to the second trigger terminal IN2 of the second stage of shift register unit $GOA_2$ and the first trigger terminal IN1 of the fourth stage of shift register unit $GOA_4$. Similarly, for the last four stages of shift register units $GOA_{X-3}$ to $GOA_X$, optionally, the signals received by the fourth trigger terminals IN4 of the shift register units from $GOA_{X-3}$ to $GOA_X$ can directly come from the trigger lines STV. The signals received by the third trigger terminals IN3 of the shift register units $GOA_{X-3}$ and $GOA_{X-2}$ can also directly come from the trigger lines STV. For example, the fifth trigger line STV5 can directly provide an electrical signal to the fourth trigger terminal IN4 of the (X−3)th stage of shift register unit $GOA_{X-3}$ and the third trigger terminal IN3 of the (X−1)th stage of shift register unit $GOA_{X-1}$, the sixth trigger line STV6 can provide an electrical signal to the fourth trigger terminal IN4 of the (X−2)th stage of shift register unit $GOA_{X-2}$ and the third trigger terminal IN3 of the Xth stage of shift register unit $GOA_X$, the seventh trigger line STV7 can directly provide an electrical signal to the fourth trigger terminal IN4 of the (X−1)th stage of shift register unit $GOA_{X-1}$, and the eighth trigger line STV8 can directly provide an electrical signal to the fourth trigger terminal IN4 of the Xth stage of shift register unit $GOA_X$. However, this is not a limitation. In further embodiments, four dummy shift register units, which are labeled as dummy-$GOA_5$, dummy-$GOA_6$, dummy-$GOA_7$, and dummy-$GOA_5$ respectively, can optionally be provided after the shift register unit $GOA_X$. The dummy-$GOA_5$ can directly provide an electrical signal to the fourth trigger terminal IN4 of the (X−3)th stage of shift register unit $GOA_{X-3}$ and the third trigger terminal IN3 of the (X−1)th stage of shift register unit $GOA_{X-1}$. The dummy-$GOA_6$ can provide an electrical signal to the fourth trigger terminal IN4 of the (X−2)th stage of shift register unit $GOA_{X-2}$ and the third trigger terminal IN3 of the Xth stage of shift register unit $GOA_X$. The dummy-$GOA_7$ can directly provide an electrical signal to the fourth trigger terminal IN4 of the (X−1)th stage of shift register unit $GOA_{X-1}$. The dummy-$GOA_5$ can directly provide an electrical signal to the fourth trigger terminal IN4 of the Xth stage of shift register unit $GOA_X$.

Figure 19:
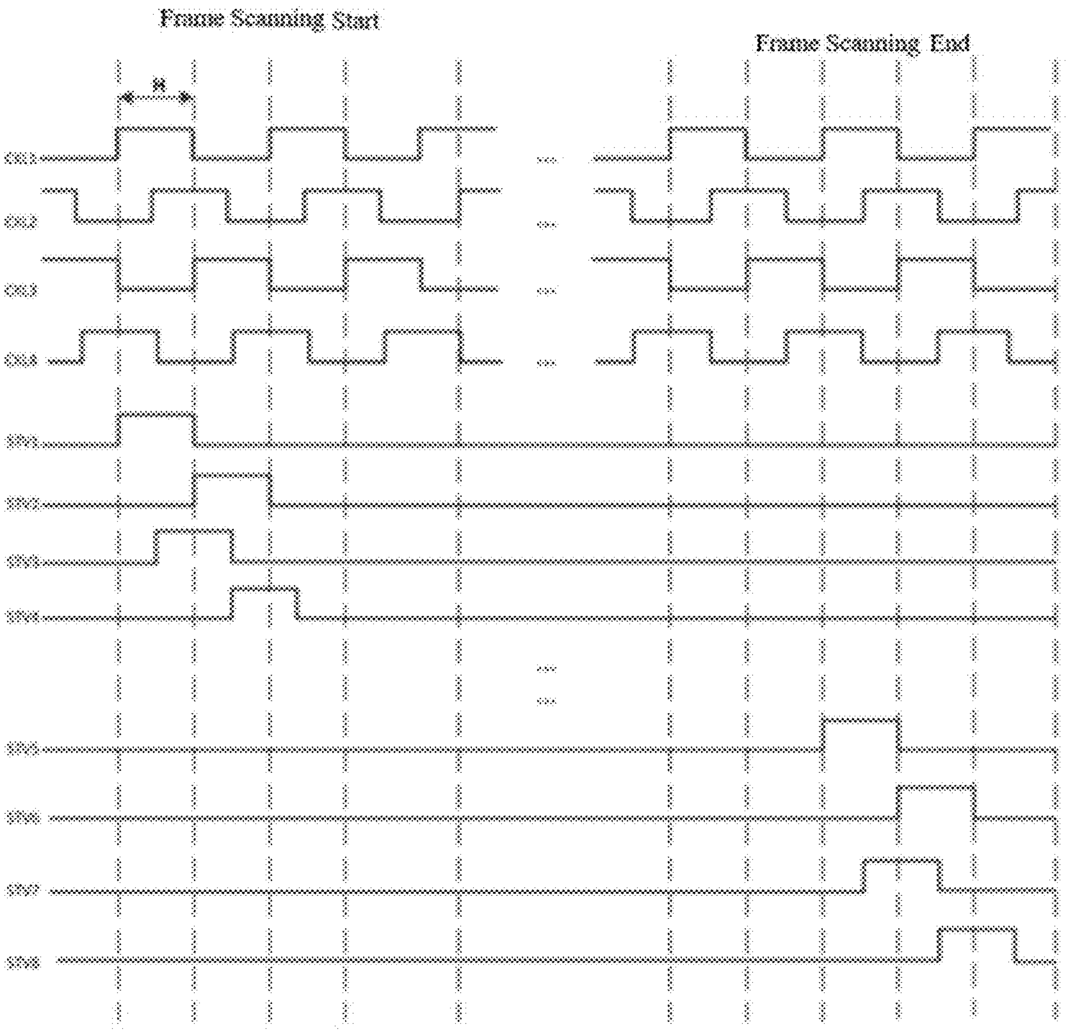
FIG. 19 is a schematic diagram of clock signals and trigger signals when the scanning circuit shown in FIG. 18 is in a forward scanning mode.

FIG. 19 is a schematic diagram of clock signals and trigger signals when the scanning circuit shown in FIG. 18 is in the forward scanning mode. As shown in FIG. 19, in the forward scanning mode, the phase of the clock signal provided by the first clock signal line CKL1 is earlier than the phase of the clock signal provided by the second clock signal line CKL2, and the phase difference between them is 1*H. The phase of the clock signal provided by the second clock signal line CKL2 is earlier than the phase of the clock signal provided by the third clock signal line CKL3, and the phase difference between them is 1*H. The phase of the clock signal provided by the third clock signal line CKL3 is earlier than the phase of the clock signal provided by the fourth clock signal line CKL4, and the phase difference between them is 1*H. The phase of the clock signal provided by the fourth clock signal line CKL4 is earlier than the phase of the clock signal provided by the first clock signal line CKL1, and the phase difference between them is 1*H. At a frame scanning start phase, the phase of the trigger signal provided by the first trigger line STV1 is earlier than the phase of the trigger signal provided by the third trigger line STV3, and the phase difference between them is 1*H. The phase of the trigger signal provided by the third trigger line STV3 is earlier than the phase of the trigger signal provided by the second trigger line STV2, and the phase difference between them is 1*H. The phase of the trigger signal provided by the second trigger line STV2 is earlier than the phase of the trigger signal provided by the fourth trigger line STV4, and the phase difference between them is 1*H. At a frame scanning end phase, the phase of the trigger signal provided by the fifth trigger line STV5 is earlier than the phase of the trigger signal provided by the seventh trigger line STV7, and the phase difference between them is 1*H. The phase of the trigger signal provided by the seventh trigger line STV7 is earlier than the phase of the trigger signal provided by the sixth trigger line STV6, and the phase difference between them is 1*H. The phase of the trigger signal provided by the sixth trigger line STV6 is earlier than the phase of the trigger signal provided by the eighth trigger line STV8, and the phase difference between them is 1*H.

Figure 20:
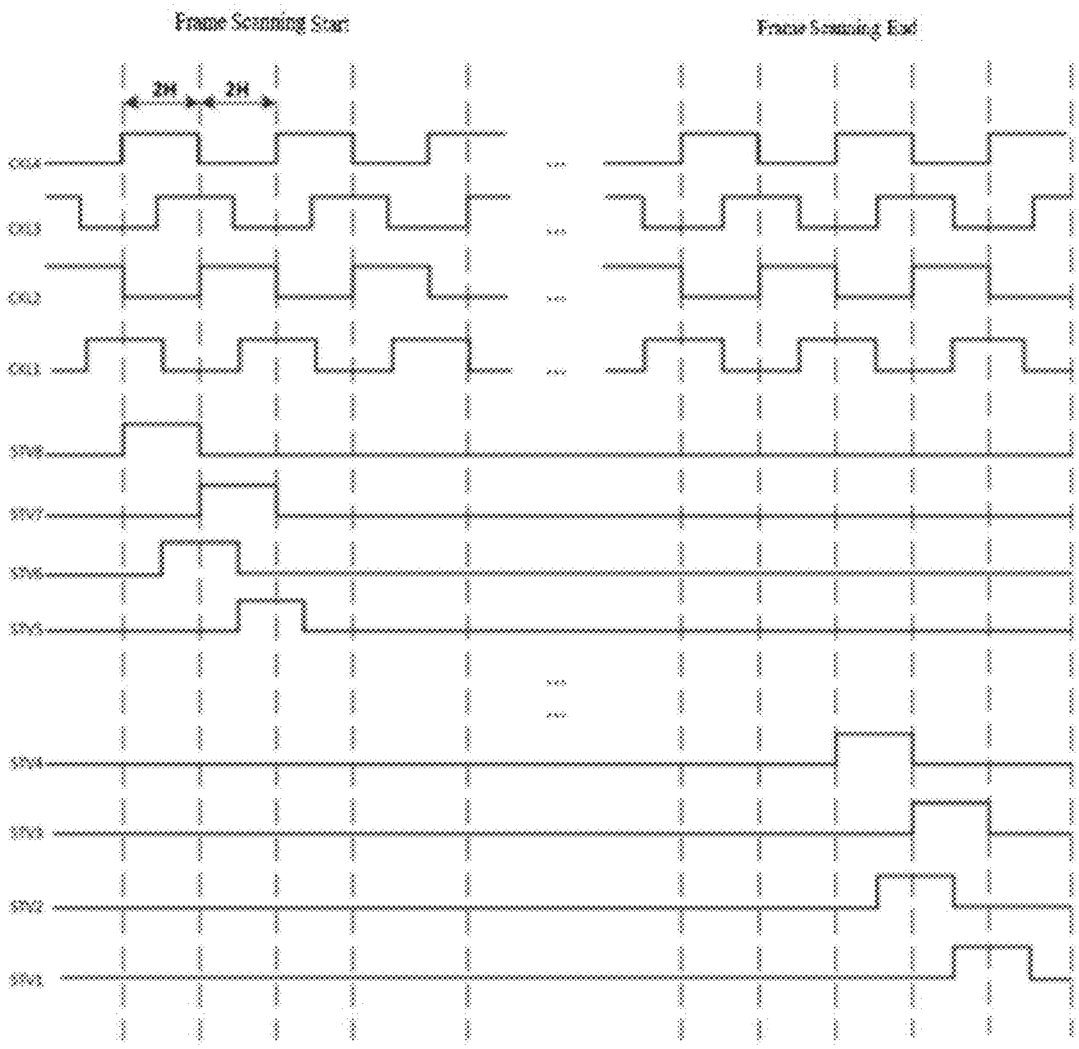
FIG. 20 is a schematic diagram of clock signals and trigger signals when the scanning circuit shown in FIG. 18 is in a reverse scanning mode.

FIG. 20 is a schematic diagram of clock signals and trigger signals when the scanning circuit shown in FIG. 18 is in the reverse scanning mode. As shown in FIG. 20, in the reverse scanning mode, the phase of the clock signal provided by the fourth clock signal line CKL4 is earlier than the phase of the clock signal provided by the third clock signal line CKL3, and the phase difference between them is 1*H. The phase of the clock signal provided by the third clock signal line CKL3 is earlier than the phase of the clock signal provided by the second clock signal line CKL2, and the phase difference between them is 1*H. The phase of the clock signal provided by the second clock signal line CKL2 is earlier than the phase of the clock signal provided by the first clock signal line CKL1, and the phase difference between them is 1*H. The phase of the clock signal provided by the second clock signal line CKL2 is earlier than the phase of the clock signal provided by the fourth clock signal line CKL4, and the phase difference between them is 1*H. At a frame scanning start phase, the phase of the trigger signal provided by the eighth trigger line STV8 is earlier than the phase of the trigger signal provided by the sixth trigger line STV6, and the phase difference between them is 1*H. The phase of the trigger signal provided by the sixth trigger line STV6 is earlier than the phase of the trigger signal provided by the seventh trigger line STV7, and the phase difference between them is 1*H. The phase of the trigger signal provided by the seventh trigger line STV7 is earlier than the phase of the trigger signal provided by the fifth trigger line STV5, and the phase difference between them is 1*H. At a frame scanning end phase, the phase of the trigger signal provided by the fourth trigger line STV4 is earlier than the phase of the trigger signal provided by the second trigger line STV2, and the phase difference between them is 1*H. The phase of the trigger signal provided by the second trigger line STV2 is earlier than the phase of the trigger signal provided by the third trigger line STV3, and the phase difference between them is 1*H. The phase of the trigger signal provided by the third trigger line STV3 is earlier than the phase of the trigger signal provided by the first trigger line STV1, and the phase difference between them is 1*H.

Figure 21:
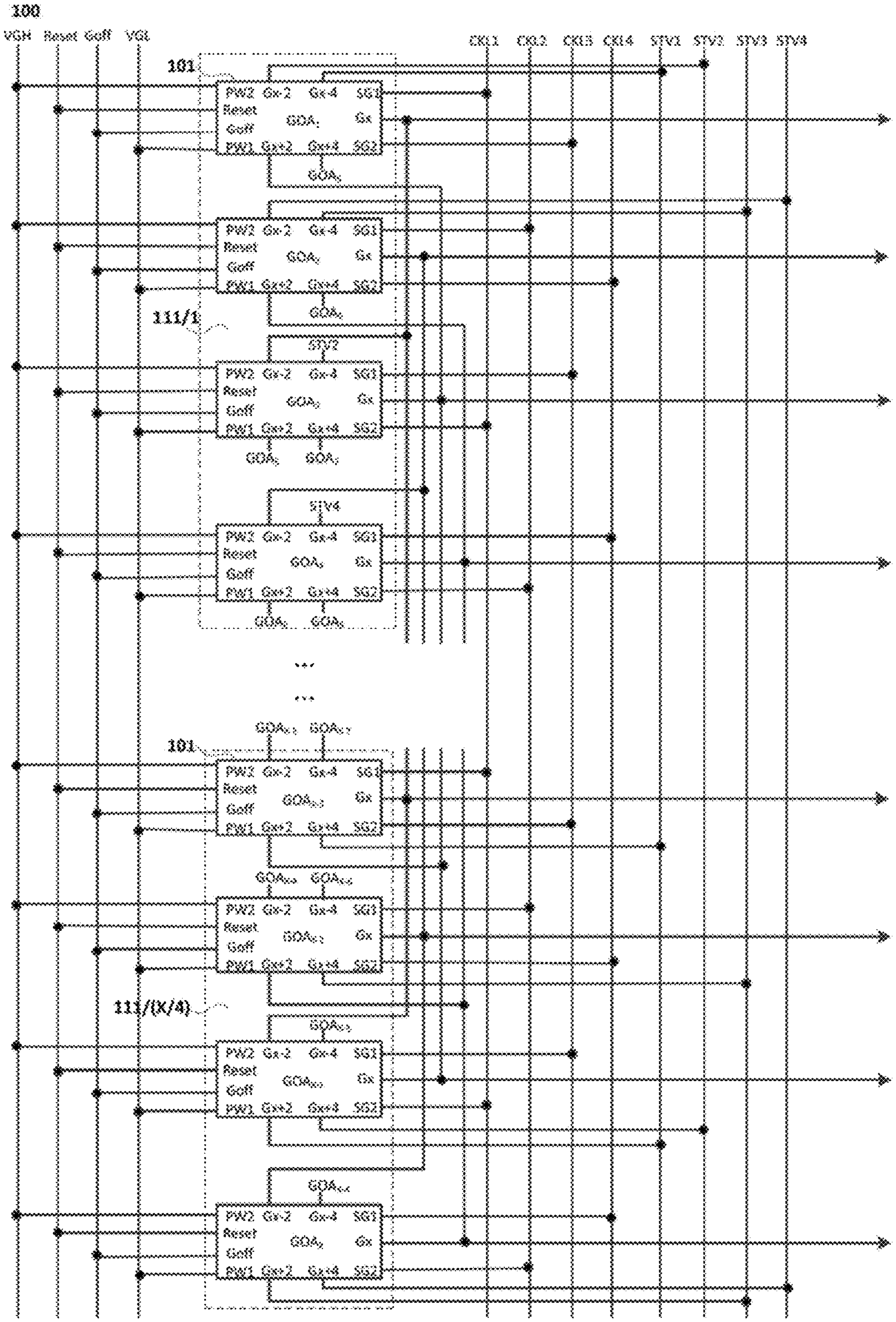
FIG. 21 is a schematic diagram of a further scanning circuit provided by an embodiment of the present application.

In yet further embodiments, FIG. 21 is a schematic diagram of yet another scanning circuit provided by an embodiment of the present application. As shown in FIG. 21, the scanning circuit 100 may include: four clock signal lines, namely a first clock signal line CKL1, a second clock signal line CKL2, a third clock signal line CKL3, and a fourth clock signal line CKL4; and four trigger lines, namely a first trigger line STV1, a second trigger line STV2, a third trigger line STV3, and a fourth trigger line STV4. That is, in the scanning circuit 100 in the embodiment shown in FIG. 18, the first trigger line STV1 is reused as the fifth trigger line STV5, the third trigger line STV3 is reused as the seventh trigger line STV7, the second trigger line STV2 is reused as the sixth trigger line STV6, and the third trigger line STV1 is reused as the eighth trigger line STV8.

In this embodiment, the first trigger terminal IN1 of the first stage of shift register unit $GOA_1$ is connected to the first trigger line STV1, and the second trigger terminal IN2 of the first stage of shift register unit $GOA_1$ is connected to the second trigger line STV2; the first trigger terminal IN1 of the second stage of shift register unit $GOA_2$ is connected to the third trigger line STV3, and the second trigger terminal IN4 of the second stage of shift register unit $GOA_2$ is connected to the fourth trigger line STV4; the first trigger terminal IN1 of the third stage of shift register unit $GOA_3$ is connected to the second trigger line STV2, and the second trigger terminal IN2 of the third stage of shift register unit $GOA_3$ is connected to the shift output terminal Gx of the first stage of shift register unit GOAT; the first trigger terminal IN1 of the fourth stage of shift register unit $GOA_4$ is connected to the fourth trigger line STV4, and the second trigger terminal IN2 of the fourth stage of shift register unit $GOA_4$ is connected to the shift output terminal Gx of the second stage of shift register unit $GOA_2$; the third trigger terminal IN3 of the (X−3)th stage of shift register unit $GOA_{X-3}$ is connected to the shift output terminal Gx of the (X−1)th stage of shift register unit $GOA_{X-1}$, and the fourth trigger terminal IN4 of the (X−3)th stage of shift register unit $GOA_{X-3}$ is connected to the first trigger line STV1; the third trigger terminal IN3 of the (X−2)th stage of shift register unit $GOA_{X-2}$ is connected to the shift output terminal Gx of the Xth stage of shift register unit $GOA_X$, and the fourth trigger terminal IN4 of the (X−2)th stage of shift register unit $GOA_{X-2}$ is connected to the third trigger line STV3; the third trigger terminal IN3 of the (X−1)th stage of shift register unit $GOA_{X-1}$ is connected to the first trigger line STV1, and the fourth trigger terminal IN4 of the (X−1)th stage of shift register unit $GOA_{X-1}$ is connected to the second trigger line STV2; and the third trigger terminal IN3 of the Xth stage of shift register unit $GOA_X$ is connected to the third trigger line STV3, and the fourth trigger terminal IN4 of the Xth stage of shift register unit $GOA_X$ is connected to the fourth trigger line STV4.

Figure 22:
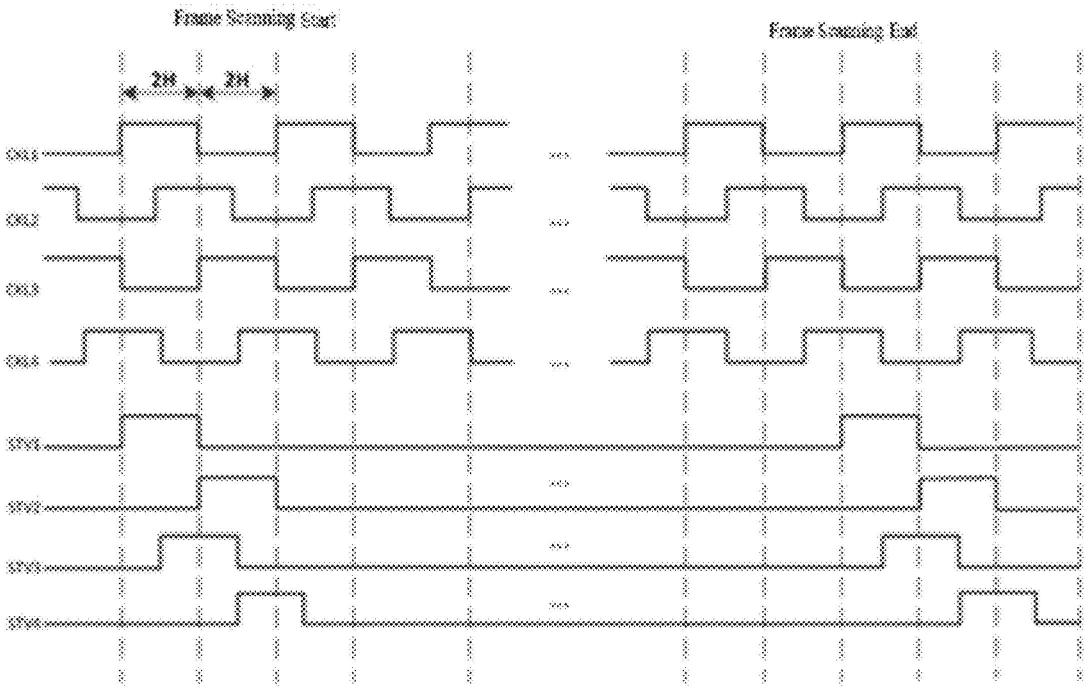
FIG. 22 is a schematic diagram of clock signals and trigger signals when the scanning circuit shown in FIG. 21 is in a forward scanning mode.

FIG. 22 is a schematic diagram of clock signals and trigger signals when the scanning circuit shown in FIG. 21 is in the forward scanning mode. As shown in FIG. 22, in the forward scanning mode, the phase of the clock signal provided by the first clock signal line CKL1 is earlier than the phase of the clock signal provided by the second clock signal line CKL2, and the phase difference between them is 1*H. The phase of the clock signal provided by the second clock signal line CKL2 is earlier than the phase of the clock signal provided by the third clock signal line CKL3, and the phase difference between them is 1*H. The phase of the clock signal provided by the third clock signal line CKL3 is earlier than the phase of the clock signal provided by the fourth clock signal line CKL4, and the phase difference between them is 1*H. The phase of the clock signal provided by the fourth clock signal line CKL4 is earlier than the phase of the clock signal provided by the first clock signal line CKL1, and the phase difference between them is 1*H. At a frame scanning start phase, the phase of the trigger signal provided by the first trigger line STV1 is earlier than the phase of the trigger signal provided by the third trigger line STV3, and the phase difference between them is 1*H. The phase of the trigger signal provided by the third trigger line STV3 is earlier than the phase of the trigger signal provided by the second trigger line STV2, and the phase difference between them is 1*H. The phase of the trigger signal provided by the second trigger line STV2 is earlier than the phase of the trigger signal provided by the fourth trigger line STV4, and the phase difference between them is 1*H. At a frame scanning end phase, the phase of the trigger signal provided by the first trigger line STV1 is earlier than the phase of the trigger signal provided by the third trigger line STV3, and the phase difference between them is 1*H. The phase of the trigger signal provided by the third trigger line STV3 is earlier than the phase of the trigger signal provided by the second trigger line STV2, and the phase difference between them is 1*H. The phase of the trigger signal provided by the second trigger line STV2 is earlier than the phase of the trigger signal provided by the fourth trigger line STV4, and the phase difference between them is 1*H.

Figure 23:
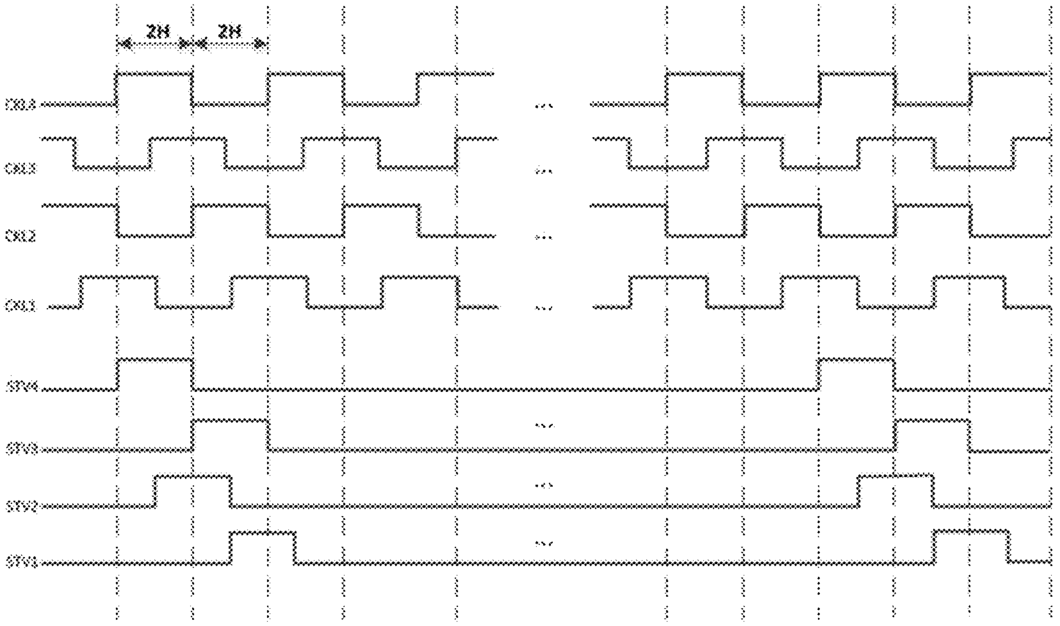
FIG. 23 is a schematic diagram of clock signals and trigger signals when the scanning circuit shown in FIG. 21 is in a reverse scanning mode.

FIG. 23 is a schematic diagram of clock signals and trigger signals when the scanning circuit shown in FIG. 21 is in the reverse scanning mode. As shown in FIG. 23, the phase of the clock signal provided by the fourth clock signal line CKL4 is earlier than the phase of the clock signal provided by the third clock signal line CKL3, and the phase difference between them is 1*H. The phase of the clock signal provided by the third clock signal line CKL3 is earlier than the phase of the clock signal provided by the second clock signal line CKL2, and the phase difference between them is 1*H. The phase of the clock signal provided by the second clock signal line CKL2 is earlier than the phase of the clock signal provided by the first clock signal line CKL1, and the phase difference between them is 1*H. The phase of the clock signal provided by the second clock signal line CKL2 is earlier than the phase of the clock signal provided by the fourth clock signal line CKL4, and the phase difference between them is 1*H. At a frame scanning start phase, the phase of the trigger signal provided by the fourth trigger line STV4 is earlier than the phase of the trigger signal provided by the second trigger line STV2, and the phase difference between them is 1*H. The phase of the trigger signal provided by the second trigger line STV2 is earlier than the phase of the trigger signal provided by the third trigger line STV3, and the phase difference between them is 1*H. The phase of the trigger signal provided by the third trigger line STV3 is earlier than the phase of the trigger signal provided by the first trigger line STV1, and the phase difference between them is 1*H. At a frame scanning end phase, the phase of the trigger signal provided by the fourth trigger line STV4 is earlier than the phase of the trigger signal provided by the second trigger line STV2, and the phase difference between them is 1*H. The phase of the trigger signal provided by the second trigger line STV2 is earlier than the phase of the trigger signal provided by the third trigger line STV3, and the phase difference between them is 1*H. The phase of the trigger signal provided by the third trigger line STV3 is earlier than the phase of the trigger signal provided by the first trigger line STV1, and the phase difference between them is 1*H. In addition, in the embodiments of the present application, the first to fourth trigger lines can be reused as the fifth to eighth trigger lines in other forms, which will not be described in detail here.

In the present application, the first electrode of the first transistor M1 is connected to the first power supply terminal PW1, the first electrode of the second transistor M2 is connected to the second power supply terminal PW2, the first electrode of the third transistor M3 is connected to the second power supply terminal PW2, and the first electrode of the fourth transistor M4 is connected to the first power supply terminal PW1. The second electrodes of the first transistor M1, the second transistor M2, the third transistor M3, and the fourth transistor M4 are all connected to the pull-up node PU. During the process of switching from forward scanning to reverse scanning or the process of switching from reverse scanning to forward scanning, the power supply signals provided by the first power supply terminal PW1 and the second power supply terminal PW2 do not change. The first power supply terminal PW1 always provides the first power supply signal VGL, and the second power supply terminal PW2 always provides the second power supply signal VGH. Even if the threshold voltages of the first transistor M1 and the fourth transistor M4 increase and their driving capabilities decrease, they no longer need to undertake the function of pulling up the pull-up node PU. After long-term forward scanning, the scanning circuit 100 can normally switch to the reverse scanning mode, or after long-term reverse scanning, the scanning circuit 100 can normally switch to the forward scanning mode. As such, the output stability, reliability, and trustworthiness of the shift register units 101 can be improved.

Figure 24:
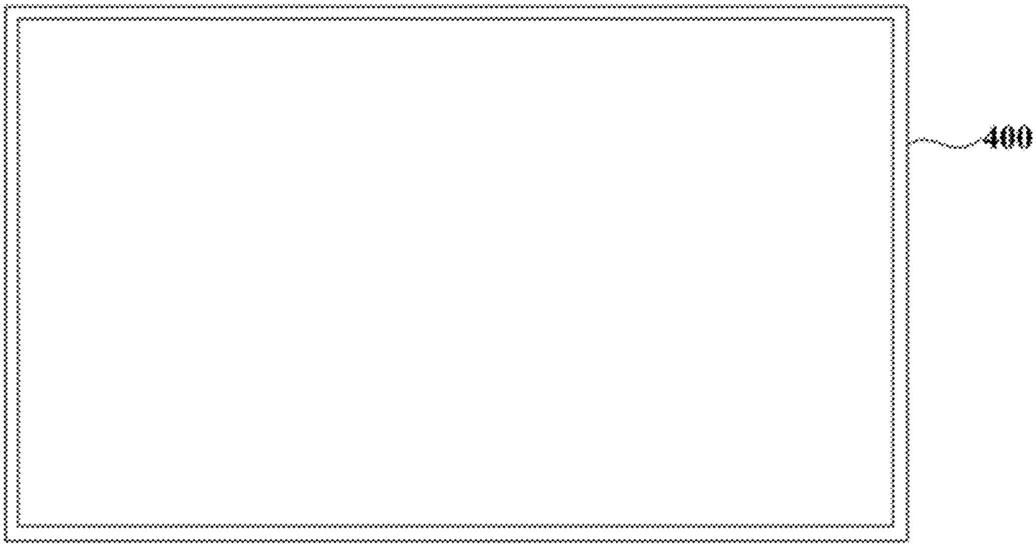
FIG. 24 is a schematic diagram of a display apparatus provided by an embodiment of the present application.

Based on the same inventive concept, an embodiment of the present application further provides a display panel and a display apparatus, which include the array substrate described in any of the above embodiments. Optionally, the display panel may be, but is not limited to, an organic light-emitting display panel, a micro-LED display panel, a liquid-crystal display panel, etc. FIG. 24 is a schematic diagram of a display apparatus provided by an embodiment of the present application. Optionally, the display apparatus may be applied to an electronic device 400 such as a smartphone, a tablet, and an in-vehicle display. It can be understood that any of the above embodiments only provides a partial illustration or a local structure of the array substrate, and in practical applications, the array substrate further includes other structures, which will not be described in detail here. The display apparatus provided by the embodiment of the present application has all the functions and beneficial effects of the above-mentioned display panel and array substrate, which will not be described in detail again.

The above description of the disclosed embodiments enables those skilled in the art to implement or use the present application. Various modifications to these embodiments will be apparent to those skilled in the art, and the general principles defined herein can be implemented in other embodiments without departing from the spirit or scope of the present application. Therefore, the present application will not be limited to these embodiments shown herein, but will be subject to the broadest scope consistent with the principles and novel features disclosed herein.

What is claimed is:

1. An array substrate, comprising:

a scanning circuit comprising multiple stages of shift register units, wherein each shift register unit of the shift register units comprises at least a first input unit, a second input unit, a third input unit, and a fourth input unit, wherein a control terminal of the first input unit is electrically connected to a first trigger terminal, an input terminal of the first input unit is electrically connected to a first power supply terminal, and an output terminal of the first input unit is electrically connected to a pull-up node, wherein the first input unit is configured to adjust a potential of the pull-up node based on a first power supply signal provided by the first power supply terminal in response to the control of the first trigger terminal;

a control terminal of the second input unit is electrically connected to a second trigger terminal, an input terminal of the second input unit is electrically connected to a second power supply terminal, and an output terminal of the second input unit is electrically connected to the pull-up node, wherein the second input unit is configured to adjust the potential of the pull-up node based on a second power supply signal provided by the second power supply terminal in response to the control of the second trigger terminal;

a control terminal of the third input unit is electrically connected to a third trigger terminal, an input terminal of the third input unit is electrically connected to the second power supply terminal, and an output terminal of the third input unit is electrically connected to the pull-up node, wherein the third input unit is configured to adjust the potential of the pull-up node based on the second power supply signal provided by the second power supply terminal in response to the control of the third trigger terminal;

a control terminal of the fourth input unit is electrically connected to a fourth trigger terminal, an input terminal of the fourth input unit is electrically connected to the first power supply terminal, and an output terminal of the fourth input unit is electrically connected to the pull-up node, wherein the fourth input unit is configured to adjust the potential of the pull-up node based on the first power supply signal provided by the first power supply terminal in response to the control of the fourth trigger terminal; and wherein the first power supply signal and the second power supply signal have different electrical characteristics.

2. The array substrate according to claim 1, wherein each shift register unit of the shift register units further comprises an output unit, wherein a control terminal of the output unit is electrically connected to the pull-up node, an input terminal of the output unit is electrically connected to a first signal terminal, and an output terminal of the output unit is electrically connected to a drive output terminal, wherein the output unit is configured to adjust a signal of the drive output terminal based on a first signal provided by the first signal terminal in response to the control of the pull-up node.

3. The array substrate according to claim 2, wherein each shift register unit of the shift register units further comprises a first reset unit, wherein a control terminal of the first reset unit is electrically connected to a second signal terminal, an input terminal of the first reset unit is electrically connected to the first power supply terminal, and an output terminal of the first reset unit is electrically connected to the drive output terminal, wherein the first reset unit is configured to adjust a signal of the drive output terminal based on the first power supply signal provided by the first power supply terminal in response to the control of a second signal provided by the second signal terminal.

4. The array substrate according to claim 3, wherein the first reset unit comprises a sixth transistor, wherein a gate of the sixth transistor is connected to the second signal terminal, and the sixth transistor is connected between the first power supply terminal and the drive output terminal.

5. The array substrate according to claim 2, wherein the output unit comprises a fifth transistor, wherein a gate of the fifth transistor is connected to the pull-up node, and the fifth transistor is connected between the first signal terminal and the drive output terminal.

6. The array substrate according to claim 2, wherein each shift register unit of the shift register units further comprises a second reset unit, a third reset unit, and a node control unit;

a control terminal of the second reset unit is electrically connected to a third signal terminal, an input terminal of the second reset unit is electrically connected to the first power supply terminal, and an output terminal of the second reset unit is electrically connected to the pull-up node, wherein the second reset unit is configured to adjust the potential of the pull-up node based on the first power supply signal provided by the first power supply terminal in response to the control of the third signal terminal;

a control terminal of the third reset unit is electrically connected to a fourth signal terminal, an input terminal of the third reset unit is electrically connected to the first power supply terminal, and an output terminal of the third reset unit is electrically connected to the drive output terminal, wherein the third reset unit is configured to adjust the signal of the drive output terminal based on the first power supply signal provided by the first power supply terminal in response to the control of the fourth signal terminal; and a control terminal of the node control unit is electrically connected to the pull-up node and a pull-down node, an input terminal of the node control unit is electrically connected to the first power supply terminal, and an output terminal of the node control unit is electrically connected to the pull-up node, the pull-down node, and the drive output terminal, wherein the node control unit is configured to adjust a signal of the pull-up node, a signal of the pull-down node, and the signal of the drive output terminal based on the first power supply signal provided by the first power supply terminal in response to the control of the pull-up node or the pull-down node.

7. The array substrate according to claim 6, wherein the second reset unit comprises a seventh transistor, wherein a gate of the seventh transistor is connected to the third signal terminal, and the seventh transistor is connected between the first power supply terminal and the pull-up node;

the third reset unit comprises an eighth transistor, wherein a gate of the eighth transistor is connected to the fourth signal terminal, and the eighth transistor is connected between the first power supply terminal and the drive output terminal; and the node control unit comprises a ninth transistor, a tenth transistor, and an eleventh transistor, wherein a gate of the ninth transistor is connected to the pull-up node, and the ninth transistor is connected between the first power supply terminal and the pull-down node, wherein a gate of the tenth transistor and a gate of the eleventh transistor are both connected to the pull-down node, the tenth transistor is connected between the first power supply terminal and the pull-up node, and wherein the eleventh transistor is connected between the first power supply terminal and the drive output terminal.

8. The array substrate according to claim 7, wherein each shift register unit of the shift register units further comprises a first capacitor and a second capacitor, wherein the first capacitor is coupled between the pull-up node and the drive output terminal, and the second capacitor is coupled between the pull-down node and the first signal terminal.

9. The array substrate according to claim 2, wherein the scanning circuit comprises Y clock signal lines and k*Y trigger lines, and wherein k≥1, Y≥2, and both k and Y are positive integers.

10. The array substrate according to claim 9, wherein the scanning circuit comprises a forward scanning mode and a reverse scanning mode, the scanning circuit comprises X stages of shift register units in cascade, and each stage of X shift register units comprises at least one shift output terminal, and the drive output terminal is reused as the shift output terminal.

11. The array substrate according to claim 10, wherein the scanning circuit comprises two clock signal lines and two trigger lines, the two clock signal lines comprise a first clock signal line and a second clock signal line, and the two trigger lines comprise a first trigger line and a second trigger line; and wherein a first trigger terminal of a first stage of shift register unit of the scanning circuit is connected to the first trigger line, and a second trigger terminal of the first stage of shift register unit is connected to the second trigger line; and a first trigger terminal of a second stage of shift register unit is connected to the second trigger line, and a second trigger terminal of the second stage of shift register unit is connected to the shift output terminal of the first stage of shift register unit.

12. The array substrate according to claim 11, wherein a third trigger terminal of a (X−1)th stage of shift register unit of the scanning circuit is connected to the shift output terminal of a Xth stage of shift register unit, and a fourth trigger terminal of the (X−1)th stage of shift register unit is connected to the second trigger line, a third trigger terminal of the Xth stage of shift register unit is connected to the second trigger line, and a fourth trigger terminal of the Xth stage of shift register unit is connected to the first trigger line; or a third trigger terminal of a (X−1)th stage of shift register unit is connected to the shift output terminal of a Xth stage of shift register unit, a fourth trigger terminal of the (X−1)th stage of shift register unit is connected to the first trigger line, a third trigger terminal of the Xth stage of shift register unit is connected to the first trigger line, and a fourth trigger terminal of the Xth stage of shift register unit is connected to the second trigger line.

13. The array substrate according to claim 10, wherein the scanning circuit comprises two clock signal lines and four trigger lines, the two clock signal lines comprise a first clock signal line and a second clock signal line, and the four trigger lines comprise a first trigger line, a second trigger line, a third trigger line, and a fourth trigger line; and wherein a first trigger terminal of a first stage of shift register unit of the scanning circuit is connected to the first trigger line, and a second trigger terminal of the first stage of shift register unit is connected to the second trigger line;

a first trigger terminal of a second stage of shift register unit is connected to the second trigger line, and a second trigger terminal of the second stage of shift register unit is connected to the shift output terminal of the first stage of shift register unit;

a third trigger terminal of a (X−1)th stage of shift register unit is connected to the shift output terminal of a Xth stage of shift register unit, and a fourth trigger terminal of the (X−1)th stage of shift register unit is connected to the third trigger line; and a third trigger terminal of the Xth stage of shift register unit is connected to the third trigger line, and a fourth trigger terminal of the Xth stage of shift register unit is connected to the fourth trigger line.

14. The array substrate according to claim 10, wherein the scanning circuit comprises four clock signal lines and four trigger lines, the four clock signal lines comprise a first clock signal line, a second clock signal line, a third clock signal line, and a fourth clock signal line, and the four trigger lines comprise a first trigger line, a second trigger line, a third trigger line, and a fourth trigger line; and wherein a first trigger terminal of a first stage of shift register unit is connected to the first trigger line, and a second trigger terminal of the first stage of shift register unit is connected to the second trigger line;

a first trigger terminal of a second stage of shift register unit is connected to the third trigger line, and a second trigger terminal of the second stage of shift register unit is connected to the fourth trigger line;

a first trigger terminal of a third stage of shift register unit is connected to the second trigger line, and a second trigger terminal of the third stage of shift register unit is connected to the shift output terminal of the first stage of shift register unit; and a first trigger terminal of a fourth stage of shift register unit is connected to the fourth trigger line, and a second trigger terminal of the fourth stage of shift register unit is connected to the shift output terminal of the second stage of shift register unit.

15. The array substrate according to claim 14, wherein a third trigger terminal of a (X−3)th stage of shift register unit of the scanning circuit is connected to the shift output terminal of a (X−1)th stage of shift register unit, and a fourth trigger terminal of the (X−3)th stage of shift register unit is connected to the first trigger line;

a third trigger terminal of a (X−2)th stage of shift register unit is connected to the shift output terminal of a Xth stage of shift register unit, and a fourth trigger terminal of the (X−2)th stage of shift register unit is connected to the third trigger line;

a third trigger terminal of the (X−1)th stage of shift register unit is connected to the first trigger line, and a fourth trigger terminal of the (X−1)th stage of shift register unit is connected to the second trigger line; and a third trigger terminal of the Xth stage of shift register unit is connected to the third trigger line, and a fourth trigger terminal of the Xth stage of shift register unit is connected to the fourth trigger line.

16. The array substrate according to claim 10, wherein the scanning circuit comprises four clock signal lines and eight trigger lines, the four clock signal lines comprise a first clock signal line, a second clock signal line, a third clock signal line, and a fourth clock signal line, and the eight trigger lines comprise a first trigger line, a second trigger line, a third trigger line, a fourth trigger line, a fifth trigger line, a sixth trigger line, a seventh trigger line, and an eighth trigger line; and wherein a first trigger terminal of a first stage of shift register unit is connected to the first trigger line, and a second trigger terminal of the first stage of shift register unit is connected to the second trigger line;

a first trigger terminal of a second stage of shift register unit is connected to the third trigger line, and a second trigger terminal of the second stage of shift register unit is connected to the fourth trigger line;

a first trigger terminal of a third stage of shift register unit is connected to the second trigger line, and a second trigger terminal of the third stage of shift register unit is connected to the shift output terminal of the first stage of shift register unit;

a first trigger terminal of a fourth stage of shift register unit is connected to the fourth trigger line, and a second trigger terminal of the fourth stage of shift register unit is connected to the shift output terminal of the second stage of shift register unit;

a third trigger terminal of a (X−3)th stage of shift register unit is connected to the shift output terminal of a (X−1)th stage of shift register unit, and a fourth trigger terminal of the (X−3)th stage of shift register unit is connected to the fifth trigger line;

a third trigger terminal of a (X−2)th stage of shift register unit is connected to the shift output terminal of a Xth stage of shift register unit, and a fourth trigger terminal of the (X−2)th stage of shift register unit is connected to the seventh trigger line;

a third trigger terminal of the (X−1)th stage of shift register unit is connected to the fifth trigger line, and a fourth trigger terminal of the (X−1)th stage of shift register unit is connected to the sixth trigger line; and a third trigger terminal of the Xth stage of shift register unit is connected to the seventh trigger line, and a fourth trigger terminal of the Xth stage of shift register unit is connected to the eighth trigger line.

17. The array substrate according to claim 1, wherein the first input unit comprises a first transistor, a gate of the first transistor is connected to the first trigger terminal, and the first transistor is connected between the first power supply terminal and the pull-up node;

the second input unit comprises a second transistor, a gate of the second transistor is connected to the second trigger terminal, and the second transistor is connected between the second power supply terminal and the pull-up node;

the third input unit comprises a third transistor, a gate of the third transistor is connected to the third trigger terminal, and the third transistor is connected between the second power supply terminal and the pull-up node; and the fourth input unit comprises a fourth transistor, a gate of the fourth transistor is connected to the fourth trigger terminal, and the fourth transistor is connected between the first power supply terminal and the pull-up node.

18. An array substrate, comprising X stages of shift register units, wherein each stage of the X stages of shift register units comprises a forward and reverse scanning module, and the forward and reverse scanning module comprises a first transistor, a second transistor, a third transistor, and a fourth transistor; and wherein a gate of the first transistor of a nth stage of shift register unit is connected to a shift output terminal of a (n−2i)th stage of shift register unit or a trigger line, and wherein n≤X, and i≥1, a first electrode of the first transistor is connected to a first power supply terminal, and a second electrode of the first transistor is connected to a pull-up node;

a gate of the second transistor of the nth stage of shift register unit is connected to a shift output terminal of a (n−i)th stage of shift register unit or the trigger line, a first electrode of the second transistor is connected to a second power supply terminal, and a second electrode of the second transistor is connected to the pull-up node;

a gate of the third transistor of a nth stage of shift register unit is connected to a shift output terminal of a (n+i)th stage of shift register unit or the trigger line, a first electrode of the third transistor is connected to the second power supply terminal, and a second electrode of the third transistor is connected to the pull-up node; and a gate of the fourth transistor of the nth stage of shift register unit is connected to a shift output terminal of a (n+2i)th stage of shift register unit or the trigger line, a first electrode of the fourth transistor is connected to the first power supply terminal, and a second electrode of the fourth transistor is connected to the pull-up node.

19. The array substrate according to claim 18, wherein the shift register unit further comprises a fifth transistor, a sixth transistor, a seventh transistor, an eighth transistor, a ninth transistor, a tenth transistor, an eleventh transistor, and a first capacitor; and wherein a gate of the fifth transistor is connected to the pull-up node, a first electrode of the fifth transistor is connected to a first signal terminal, and a second electrode of the fifth transistor is connected to a drive output terminal;

a gate of the sixth transistor is connected to a second signal terminal, a first electrode of the sixth transistor is connected to the first power supply terminal, and a second electrode of the sixth transistor is connected to the drive output terminal;

a gate of the seventh transistor is connected to a third signal terminal, a first electrode of the seventh transistor is connected to the first power supply terminal, and a second electrode of the seventh transistor is connected to the pull-up node;

a gate of the eighth transistor is connected to a fourth signal terminal, a first electrode of the eighth transistor is connected to the first power supply terminal, and a second electrode of the eighth transistor is connected to the drive output terminal;

a gate of the ninth transistor is connected to the pull-up node, a first electrode of the ninth transistor is connected to the first power supply terminal, and a second electrode of the ninth transistor is connected to a pull-down node;

a gate of the tenth transistor and a gate of the eleventh transistor are both connected to the pull-down node, a first electrode of the tenth transistor and a first electrode of the eleventh transistor are both connected to the first power supply terminal, a second electrode of the tenth transistor is connected to the pull-up node, and a second electrode of the eleventh transistor is connected to the drive output terminal; and a first electrode of the first capacitor is connected to the drive output terminal, and a second electrode of the first capacitor is connected to the pull-up node.

20. The array substrate according to claim 19, wherein the shift register unit further comprises a second capacitor, a first electrode of the second capacitor is connected to the first signal terminal, and a second electrode of the second capacitor is connected to the pull-down node.

21. A display panel, comprising an array substrate, wherein the array substrate comprises:

a scanning circuit comprising multiple stages of shift register units, wherein each shift register unit of the shift register units comprises at least a first input unit, a second input unit, a third input unit, and a fourth input unit, wherein a control terminal of the first input unit is electrically connected to a first trigger terminal, an input terminal of the first input unit is electrically connected to a first power supply terminal, and an output terminal of the first input unit is electrically connected to a pull-up node, wherein the first input unit is configured to adjust a potential of the pull-up node based on a first power supply signal provided by the first power supply terminal in response to the control of the first trigger terminal;

a control terminal of the second input unit is electrically connected to a second trigger terminal, an input terminal of the second input unit is electrically connected to a second power supply terminal, and an output terminal of the second input unit is electrically connected to the pull-up node, wherein the second input unit is configured to adjust the potential of the pull-up node based on a second power supply signal provided by the second power supply terminal in response to the control of the second trigger terminal;

a control terminal of the third input unit is electrically connected to a third trigger terminal, an input terminal of the third input unit is electrically connected to the second power supply terminal, and an output terminal of the third input unit is electrically connected to the pull-up node, wherein the third input unit is configured to adjust the potential of the pull-up node based on the second power supply signal provided by the second power supply terminal in response to the control of the third trigger terminal;

a control terminal of the fourth input unit is electrically connected to a fourth trigger terminal, an input terminal of the fourth input unit is electrically connected to the first power supply terminal, and an output terminal of the fourth input unit is electrically connected to the pull-up node, wherein the fourth input unit is configured to adjust the potential of the pull-up node based on the first power supply signal provided by the first power supply terminal in response to the control of the fourth trigger terminal; and wherein the first power supply signal and the second power supply signal have different electrical characteristics.

* * * * *